(12) United States Patent
Akahane

(10) Patent No.: US 11,059,467 B2
(45) Date of Patent: Jul. 13, 2021

(54) BRAKING FORCE CONTROL APPARATUS FOR VEHICLE

(71) Applicant: TOYOTA JIDOSHA KABUSHIKI KAISHA, Toyota (JP)

(72) Inventor: Satoru Akahane, Hadano (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 321 days.

(21) Appl. No.: 16/191,770

(22) Filed: Nov. 15, 2018

(65) Prior Publication Data
US 2019/0152458 A1   May 23, 2019

(30) Foreign Application Priority Data
Nov. 17, 2017   (JP) .............................. JP2017-221821

(51) Int. Cl.
| | | |
|---|---|---|
| *B60T 13/66* | (2006.01) | |
| *B60T 13/68* | (2006.01) | |
| *B60T 8/17* | (2006.01) | |
| *B60T 8/1764* | (2006.01) | |
| *B60T 8/40* | (2006.01) | |

(Continued)

(52) U.S. Cl.
CPC .......... *B60T 13/662* (2013.01); *B60T 8/1764* (2013.01); *B60T 8/1766* (2013.01); *B60T 8/4077* (2013.01); *B60T 13/145* (2013.01); *B60T 13/686* (2013.01); *B60T 8/4081* (2013.01); *B60T 2240/06* (2013.01)

(58) Field of Classification Search
CPC .... B60T 13/662; B60T 8/1764; B60T 8/1766; B60T 8/4077; B60T 13/145; B60T 13/686; B60T 8/4081; B60T 2240/06
See application file for complete search history.

(56) References Cited

U.S. PATENT DOCUMENTS

| | | | | |
|---|---|---|---|---|
| 5,212,640 A | * | 5/1993 | Matsuda | ............ B60G 17/0185 180/197 |
| 5,375,918 A | * | 12/1994 | Kuwana | .............. B60T 8/17636 303/144 |

(Continued)

FOREIGN PATENT DOCUMENTS

| | | |
|---|---|---|
| JP | 2012-153266 A | 8/2012 |
| JP | 2014-210497 A | 11/2014 |

(Continued)

*Primary Examiner* — Thomas J Williams
*Assistant Examiner* — James K Hsiao
(74) *Attorney, Agent, or Firm* — Sughrue Mion, PLLC

(57) ABSTRACT

A braking force control device is provided which has a control unit that controls an upstream braking actuator that generates a common upstream pressure for four wheels and a downstream braking actuator that individually controls the braking pressure supplied to each wheel using the upstream pressure. The control unit controls the upstream pressure so that the braking pressure of the front wheels is permitted to be higher than a lock pressure of the rear wheels but does not become higher than a lock pressure of the front wheels, and suppresses an increase of the braking pressure of the rear wheels so that the braking pressure does not become higher than the lock pressure of the rear wheels, in a situation where the upstream pressure can be supplied to each braking force generating device but the braking pressure of any one of the wheels cannot be decreased.

10 Claims, 7 Drawing Sheets

(51) Int. Cl.
*B60T 13/14* (2006.01)
*B60T 8/1766* (2006.01)

(56) References Cited

U.S. PATENT DOCUMENTS

| | | | | |
|---|---|---|---|---|
| 5,498,072 | A * | 3/1996 | Shimizu | B60T 8/175 303/191 |
| 5,967,629 | A * | 10/1999 | Kubota | B60T 8/1764 303/113.5 |
| 6,026,343 | A * | 2/2000 | Ogino | B60T 8/1755 701/72 |
| 8,991,939 | B2 * | 3/2015 | Nakamura | B60T 8/348 303/9.68 |
| 10,173,658 | B2 * | 1/2019 | Ninoyu | B60T 8/4077 |
| 2005/0246086 | A1 * | 11/2005 | Motosugi | B60T 8/328 701/78 |
| 2011/0231076 | A1 * | 9/2011 | Watanabe | B60T 8/404 701/70 |
| 2011/0285199 | A1 * | 11/2011 | Ishida | B60T 13/686 303/3 |
| 2012/0212044 | A1 * | 8/2012 | Nakamura | B60T 13/662 303/9.62 |
| 2013/0080016 | A1 * | 3/2013 | Bohn | B60T 13/662 701/78 |
| 2014/0244128 | A1 * | 8/2014 | Watanabe | B60T 8/1755 701/74 |
| 2015/0001917 | A1 * | 1/2015 | Murayama | B60T 13/145 303/14 |
| 2015/0035351 | A1 * | 2/2015 | Okano | B60T 8/48 303/10 |
| 2015/0127226 | A1 * | 5/2015 | Takeuchi | B60T 13/686 701/48 |
| 2016/0096434 | A1 * | 4/2016 | Nakaoka | B60L 3/108 701/78 |
| 2016/0200301 | A1 * | 7/2016 | Kamiya | F16D 61/00 303/115.1 |
| 2016/0347297 | A1 * | 12/2016 | Ninoyu | B60T 8/4077 |
| 2016/0355168 | A1 * | 12/2016 | Ninoyu | B60T 13/686 |
| 2017/0182990 | A1 | 6/2017 | Ninoyu et al. | |

FOREIGN PATENT DOCUMENTS

| | | |
|---|---|---|
| JP | 2015-143058 A | 8/2015 |
| JP | 2017-052305 A | 3/2017 |

* cited by examiner

BRAKING FORCE CONTROL APPARATUS FOR VEHICLE

CROSS-REFERENCE TO RELATED APPLICATION

The disclosure of Japanese Patent Application No. JP2017-221821 filed on Nov. 17, 2017 is incorporated by reference in its entirety.

BACKGROUND

1. Technical Field

The present disclosure relates to a braking force control apparatus for a vehicle such as an automobile.

2. Description of the Related Art

For example, as described in Japanese Patent Application Laid-open Publication No. 2012-153266, a braking force control apparatus having an upstream braking actuator that generates a common upstream pressure for the left and right front wheels and left and right rear wheels, a downstream braking actuator, and a control unit that controls these actuators are known. The upstream braking actuator includes a master cylinder device driven by braking operation of a driver. The downstream braking actuator includes a pressure increasing-holding valve and a pressure decreasing valve provided corresponding to each wheel, and controls a braking pressure supplied to a braking force generating device of each wheel using the upstream pressure by the pressure increasing-holding valve and the pressure decreasing valve.

Anti-skid control is as well performed in a vehicle equipped with a braking force control apparatus having an upstream braking actuator and a downstream braking actuator so that a braking slip of each wheel does not become excessive. In the anti-skid control, the braking pressure supplied to the braking force generating device of a wheel having a large braking slip is individually controlled by the corresponding pressure increasing-holding valve and pressure decreasing valve.

If an abnormality occurs in a pressure increasing-holding valve or a pressure decreasing valve of any of the wheels, the braking pressure of the wheel cannot be normally controlled. In the conventional braking force control apparatus, for example, when an abnormality occurs in a pressure decreasing valve of any of the wheels and it becomes impossible to reduce the braking pressure of the wheel, the anti-skid control is stopped. Therefore, it is impossible to prevent the braking slips of the wheels from becoming excessive in a situation where a braking operation amount of a driver is excessive.

Even if an abnormality occurs in the downstream braking actuator, when the abnormality is an abnormality that allows to supply the upstream pressure from the upstream braking actuator to the braking force generating devices of the respective wheels, but cannot decrease a braking pressure of any of the wheels (referred to as "specific abnormality" as necessary), it is possible to reduce the possibility that the braking slips of the wheels become excessive by controlling the upstream pressure. Conventionally, no study has been made to reduce the possibility that braking slips of the wheels become excessive by controlling the upstream pressure when a specific abnormality occurs in the downstream braking actuator. There is neither description nor suggestion in the above-mentioned publication.

By the way, in a vehicle such as a passenger car, a ground contact load of front wheels is higher than a ground contact load of rear wheels, and when the vehicle is braked, a load transfer to the front wheel side occurs. Therefore, in a situation where the vehicle is braked while traveling on a road having a high friction coefficient of a road surface, a lock pressure of the front wheels is higher than a lock pressure of the rear wheels. However, in a situation where the vehicle is braked while turning on a road having a low coefficient of friction on a road surface, since margins of longitudinal forces of the front wheels, which are steered wheels, are small, the lock pressure of the front wheels is lower than the lock pressure of the rear wheels. Furthermore, in a vehicle such as a truck, since a ground contact load of rear wheels is higher than a ground contact load of front wheels, a lock pressure of the rear wheels is higher than a lock pressure of the front wheels.

It is conceivable to prevent wheels from becoming locked by controlling an upstream pressure when a specific abnormality occurs in a downstream braking actuator even in a vehicle having different locking pressures of front and rear wheels. In that case, since braking pressures of the front wheels and the rear wheels are the same as the upstream pressures, the upstream pressure must be controlled so that the braking pressure of the wheels having a lower lock pressure ("low pressure wheels") of the front and rear wheels does not exceed the lock pressure of the low pressure wheels. Therefore, in spite that the braking pressure of the wheels having the higher locking pressure of the front and rear wheels (referred to as "high pressure wheels") is not locked even when the braking pressure of the high pressure wheels becomes higher than the lock pressure of the low pressure wheels, the braking pressure of the low pressure wheels is limited to a pressure lower than the lock pressure of the low pressure wheels. Therefore, the braking force of the high pressure wheels cannot be made higher than a braking force corresponding to the lock pressure of the low pressure wheels, and a braking force of the entire vehicle can not be increased.

SUMMARY

The present disclosure provides a braking force control apparatus which is improved to reduce the possibility that braking slips of wheels become excessive by controlling an upstream pressure when a specific abnormality in which the upstream pressure can be supplied to the braking force generating devices but a braking pressure of a wheel cannot be decreased occurs in the downstream braking actuator.

According to the present disclosure, a braking force control apparatus for a vehicle is provided which has an upstream braking actuator that includes a master cylinder device that is driven by braking operation of a driver and generates a common upstream pressure for left and right front wheels constituting a front wheel group and left and right rear wheels constituting a rear wheel group, a downstream braking actuator that individually controls braking pressures supplied to the braking force generating devices of the left and right front wheels and the left and right rear wheels using the upstream pressure, and a control unit for controlling the upstream braking actuator and the downstream braking actuator, the control unit being configured to, when an anti-skid control starting condition is satisfied for any one of the wheels, control the downstream braking actuator in a pressure increasing mode, a pressure holding mode and a pressure decreasing mode so that the degree of braking slip of the relevant wheel falls within a predetermined range until an anti-skid control ending condition is satisfied, and control the downstream braking actuator in a non-control mode so that braking pressures of the wheels other than the relevant wheel become values corresponding to the braking operation amount of the drive.

With a braking pressure when the braking pressure control mode by the anti-skid control changes from the mode other than the pressure decreasing mode to the pressure decreasing mode for the first time after the anti-skid control starting condition is satisfied being referred as a lock pressure, a lock pressure of one of the front and rear wheel groups is higher than a lock pressure of the other of the front and rear wheel groups, and the upstream braking actuator is configured to control the upstream pressure in a pressure increasing mode a pressure holding mode, a pressure decreasing mode and a non-controlling mode, and set the upstream pressure to the pressure in the master cylinder device in the non-control mode.

The control unit is configured to execute an alternative anti-skid control in which the braking pressure of the one wheel group is controlled, by controlling at least the upstream braking actuator in a situation where the upstream pressure is supplied to the braking force generating device of each wheel, so that the braking pressure of the one wheel group is permitted to be higher than the lock pressure of the other wheel group but does not become higher than the lock pressure of the one wheel group, and the braking pressure of the other wheel group is controlled so that the braking pressure of the other wheel group does not become higher than the lock pressure of the other wheel group, when a specific abnormality in which the upstream pressure can be supplied from the upstream braking actuator to the braking force generating device of each wheel but the braking pressure supplied to the braking force generating device of any one of the wheels cannot be decreased occurs in the downstream braking actuator.

According to the above configuration, when a specific abnormality occurs in the downstream braking actuator, alternative anti-skid control is performed in a situation where the upstream pressure is supplied to the braking force generating device of each wheel. In the alternative anti-skid control, by controlling at least the upstream pressure, in the situation where the upstream pressure is supplied to the braking force generating device of each wheel, the braking pressure of one wheel group is controlled so that the braking pressure of the one wheel group is permitted to be higher than the lock pressure of the other wheel group but does not become higher than the lock pressure of the one wheel group. The braking pressure of the other wheel group is controlled so that the braking pressure of the other wheel group does not become higher than the lock pressure of the other wheel group.

Therefore, while preventing the one wheel group which is the high pressure wheel group and the other wheel group which is the low pressure wheel group from entering a locked state, it is possible to make the braking force of one wheel group higher than the lock pressure of the other wheel group by allowing the braking pressure of one wheel group to be higher than the locking pressure of the other wheel group. Accordingly, in the situation where the upstream pressure is common to all four wheels and the lock pressure of the front wheel group and the lock pressure of the rear wheel group are different, when a specific abnormality occurs in the downstream braking actuator, the braking force of the high pressure wheel group can be increased as compared with a conventional case, and the front wheel group and the rear wheel group can be prevented from being locked.

Notably, the lock pressure of the one wheel group is a braking pressure at a time point when the braking pressure control mode by the anti-skid control changes from the mode other than the pressure decreasing mode to the pressure decreasing mode for the first time after the anti-skid control starting condition is satisfied for the one wheel group, and when the braking pressure of the one wheel group exceeds the lock pressure of the one wheel group, the one wheel group becomes looked. In similar, the lock pressure of the other wheel group is a braking pressure at a time point when the braking pressure control mode by the anti-skid control changes from the mode other than the pressure decreasing mode to the pressure decreasing mode for the first time after the anti-skid control starting condition is satisfied for the other wheel group, and when the braking pressure of the other wheel group exceeds the lock pressure of the other wheel group, the other wheel group becomes locked.

In another aspect of the present disclosure, the control unit is configured to determine the front wheel group or the rear wheel group that includes the wheel whose control mode of the braking pressure by the anti-skid control was changed from the non-control mode to the pressure decreasing mode for the first time after the anti-skid control starting condition is satisfied of the left and right front wheels and the left and right rear wheels to be the other wheel group.

According to the above aspect, the front wheel group or the rear wheel group that includes the wheel whose control mode of the braking pressure by the anti-skid control was changed from the non-control mode to the pressure decreasing mode for the first time after the anti-skid control starting condition is satisfied of the left and right front wheels and the left and right rear wheels is determined to be the other wheel group. Therefore, even in a vehicle in which wheels that are first required to decrease the braking pressure by anti-skid control become either front wheels or rear wheels depending on driving conditions, it is possible to determine the high pressure wheel group by determining the low pressure wheel group.

Further, in another aspect of the present disclosure, the control unit is configured to decrease the upstream pressure to a pressure lower than the lock pressure of the other wheel group and, thereafter, to increase, by increasing the upstream pressure, the braking pressure of the one wheel group to a pressure higher than the lock pressure of the other wheel group and equal to or lower than the lock pressure of the one wheel group, while suppressing the increase of the braking pressure of the other wheel group so that the braking pressure of the other wheel group does not become higher than the lock pressure of the other wheel group, when the starting condition of the antiskid control is satisfied for the other wheel group and the braking pressure control mode by the anti-skid control is changed from the mode other than the pressure decreasing mode to the pressure decreasing mode in a situation where the alternative anti-skid control is performed and the braking pressure of the one wheel group and the braking pressure of the other wheel group are equal to or lower than the lock pressure of the other wheel group.

According to the above aspect, when the starting condition of the antiskid control is satisfied for the other wheel group and the braking pressure control mode by the anti-skid control is changed from the mode other than the pressure decreasing mode to the pressure decreasing mode in a situation where the alternative anti-skid control is performed and the braking pressure of the one wheel group and the other wheel group are equal to or lower than the lock pressure of the other wheel group, the upstream pressure is first decreased to a pressure lower than the lock pressure of the other wheel group. Therefore, since the braking pressures of the one wheel group and the other wheel group are decreased to a pressure lower than the lock pressure of the other wheel group by the decrease of the upstream pressure, the other wheel group can be prevented from becoming locked.

The braking pressure of the one wheel group is increased by increasing the upstream pressure to a pressure higher than the lock pressure of the other wheel group and equal to or lower than the lock pressure of the one wheel group, while the increase of the braking pressure of the other wheel group is suppressed so that the braking pressure of the other wheel group does not become higher than the lock pressure of the other wheel group. Therefore, the other wheel group can be prevented from becoming locked and the braking pressure of the one wheel group can be increased so that the braking pressure of the one wheel group become a braking pressure that is higher than a braking pressure corresponding to the lock pressure of the other wheel group and lower than a braking pressure that causes the one wheel group locked.

Further, in another aspect of the present disclosure, the control unit is configured to decrease the upstream pressure to a pressure higher than the lock pressure of the other wheel group and equal to or lower than the lock pressure of the one wheel group, thereafter, to control the upstream pressure by the same control mode as that of the anti-skid control on the one wheel group, when the starting condition of the antiskid control is satisfied for the one wheel group and the braking pressure control mode by the anti-skid control is changed from the mode other than the pressure decreasing mode to the pressure decreasing mode in a situation where the alternative anti-skid control is performed.

According to the above aspect, the upstream pressure is first decreased to a pressure higher than the lock pressure of the other wheel group and equal to or lower than the lock pressure of the one wheel group when the starting condition of the antiskid control is satisfied for the one wheel group and the braking pressure control mode by the anti-skid control is changed from the mode other than the pressure decreasing mode to the pressure decreasing mode in a situation where the alternative anti-skid control is performed. Therefore, since the braking pressure of the one wheel group becomes a pressure equal to or lower than the lock pressure of the one wheel group, the one wheel group can be prevented from becoming locked.

The upstream pressure reduced in pressure is controlled by the same control mode as that of the anti-skid control on the one wheel group. Therefore, the braking pressure of the one wheel group is controlled by the control mode of the alternative anti-skid control for the one wheel group, which enables to prevent the one wheel group from becoming locked even after the upstream pressure is decreased in pressure.

Further, in another aspect of the present disclosure, the control unit is configured to decrease the upstream pressure to a pressure lower than the lock pressure of the other wheel group and, thereafter, to increase, by increasing the upstream pressure, the braking pressure of the one wheel group to a pressure higher than the lock pressure of the other wheel group and equal to or lower than the lock pressure of the one wheel group, while suppressing the increase of the braking pressure of the other wheel group, when the starting condition of the antiskid control is satisfied for the other wheel group and the braking pressure control mode by the anti-skid control is changed from the mode other than the pressure decreasing mode to the pressure decreasing mode in a situation where the alternative anti-skid control is performed and the braking pressure of the one wheel group is higher than the braking pressure of the other wheel group and is lower than the lock pressure of the one wheel group.

According to the above aspect, the upstream pressure is decreased to a pressure lower than the lock pressure of the other wheel group when the starting condition of the antiskid control is satisfied for the other wheel group and the braking pressure control mode by the anti-skid control is changed from the mode other than the pressure decreasing mode to the pressure decreasing mode in a situation where the alternative anti-skid control is performed and the braking pressure of the one wheel group is higher than the braking pressure of the other wheel group and is lower than the lock pressure of the one wheel group. Therefore, the braking pressure of the other wheel group is decreased by decreasing the upstream pressure which enables to prevent the other wheel group from becoming locked.

The braking pressure of the one wheel group is increased by increasing the upstream pressure to a pressure higher than the lock pressure of the other wheel group and equal to or lower than the lock pressure of the one wheel group while suppressing the increase of the braking pressure of the other wheel group. Therefore, the other wheel group can be prevented from becoming locked and the braking pressure of the one wheel group can be increased so that the braking pressure of the one wheel group becomes a braking pressure that is higher than a braking pressure corresponding to the lock pressure of the other wheel group and lower than a braking pressure that causes the one wheel group locked.

Further, in another aspect of the present disclosure, the control unit is configured to suppress the increase of the braking pressure of the other wheel group by decreasing the upstream pressure to a pressure lower than the lock pressure of the other wheel group and, thereafter, holding the braking pressure of the other wheel group for a prescribed period of time.

According to the above aspect, the increase of the braking pressure of the other wheel group is suppressed by decreasing the upstream pressure to a pressure lower than the lock pressure of the other wheel group and, thereafter, holding the braking pressure of the other wheel group for a prescribed period of time. Therefore, as compared to where the braking pressure of the other wheel group is increased without being held when the decrease of the upstream pressure has been completed, the possibility that the other wheel group is locked can effectively be reduced in a situation where the braking pressure of the one wheel group is increased by increasing the upstream pressure.

Further, in another aspect of the present disclosure, the control unit is configured to suppress the increase of the braking pressure of the other wheel group by decreasing the upstream pressure to a pressure lower than the lock pressure of the other wheel group and, thereafter, increasing the braking pressure of the other wheel group at a pressure increase gradient lower than the pressure increase gradient of the upstream pressure.

According to the above aspect, the increase of the braking pressure of the other wheel group is suppressed by decreasing the upstream pressure to a pressure lower than the lock pressure of the other wheel group and, thereafter, increasing the braking pressure of the other wheel group at a pressure increase gradient lower than the pressure increase gradient of the upstream pressure. Therefore, as compared to where the braking pressure of the other wheel group is increased at a pressure increase gradient equal to or higher than the pressure increase gradient of the upstream pressure when the decrease of the upstream pressure has been completed, the possibility that the other wheel group is locked can effectively be reduced in a situation where the braking pressure of the one wheel group is increased by increasing the upstream pressure.

Further, in another aspect of the present disclosure, the downstream braking actuator includes a pressure increasing-decreasing control valve provided corresponding to each wheel, and the control unit is configured to increase the braking pressure of the one wheel group to a pressure higher than the lock, pressure of the other wheel group and equal to or lower than the lock pressure of the one wheel group by controlling the upstream pressure to a pressure higher than the lock pressure of the other wheel group and equal to or lower than the lock pressure of the one wheel group, and to suppress the increase of the braking pressure of the other wheel group by controlling the pressure increasing-decreasing control valves of the other wheel group.

According to the above aspect, the upstream pressure is controlled to a pressure higher than the lock pressure of the other wheel group and equal to or lower than the lock pressure of the one wheel group. Therefore, the braking pressure of the one wheel group can be increased to a pressure higher than the lock pressure of the other wheel group and equal to or lower than the lock pressure of the one wheel group without controlling the pressure increasing-decreasing control valves of the one wheel group.

Further, in another aspect of the present disclosure, the downstream braking actuator includes a pressure increasing-decreasing control valve provided corresponding to each wheel, and the control unit is configured to increase the braking pressure of the one wheel group to a pressure higher than the lock pressure of the other wheel group and equal to or lower than the lock pressure of the one wheel group by increasing the upstream pressure to a pressure higher than the lock pressure of the other wheel group and controlling the pressure increasing-decreasing control valves of the one wheel group, and to suppress the increase of the braking pressure of the other wheel group by controlling the pressure increasing-decreasing control valves of the other wheel group.

According to the above aspect, the braking pressure of the one wheel group is increased to a pressure higher than the lock pressure of the other wheel group and equal to or lower than the lock pressure of the one wheel group by increasing the upstream pressure to a pressure higher than the lock pressure of the other wheel group and controlling the pressure increasing-decreasing control valves of the one wheel group. Therefore, the braking pressure of the one wheel group can be increased to a pressure higher than the lock pressure of the other wheel group and equal to or lower than the lock pressure of the one wheel group without limiting the upstream pressure to a pressure equal to or lower than the lock pressure of the one wheel group.

Further, in another aspect of the present disclosure, the control unit is configured to increase the upstream pressure to a value that the upstream pressure took at a time when the decrease of the upstream pressure was started.

According to the above aspect, the upstream pressure is increased to a value that the upstream pressure took at a time when the decrease of the upstream pressure was started. Therefore, the upstream pressure and the braking pressure of the one wheel group can be prevented from being excessively increased and can be prevented from being insufficiently increased.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

Figure 1:
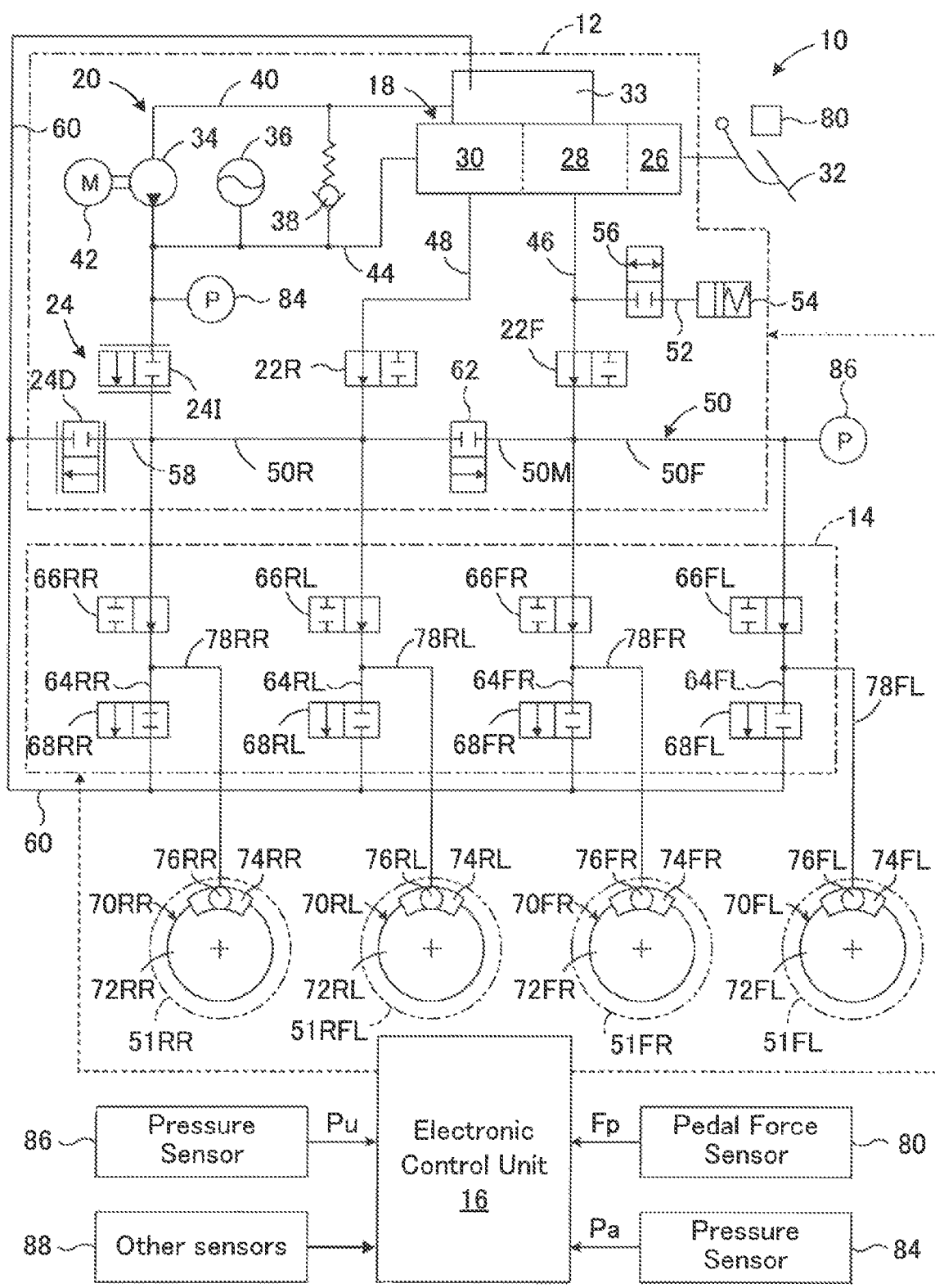
FIG. 1 is a schematic configuration diagram showing a first embodiment of a braking force apparatus for a vehicle according to the present disclosure.

As shown in FIG. 1, the braking force control apparatus 10 comprises an upstream braking actuator 12, a downstream braking actuator 14, and an electronic control unit (ECU) 16 as a control device for controlling the upstream braking actuator and the downstream braking actuator. The upstream braking actuator 12 includes a master cylinder device 18 driven by braking operation of a driver, a hydraulic pressure supply source 20 master cut valves 22F and 22R, and an upstream pressure control valve 24. In FIG. 1, the illustration of springs and solenoids of each valve is omitted for the purpose of simplification.

The master cylinder device 18 has a booster 26, a master cylinder 28 and a regulator 30. A brake pedal 32 operated by the driver is connected to the booster 26, and a reservoir 33 that stores a brake oil (not shown) as a working fluid is connected to the master cylinder 28 and the regulator 30. As is well known, a pressure of the regulator 30 is controlled to be substantially the same as a pressure of the master cylinder 28. Since the functions of the booster 26, the master cylinder 28 and the regulator 30 are well known by those skilled in the art, descriptions thereof will be omitted.

The hydraulic pressure supply source 20 includes an oil pump 34, an accumulator 36 and a relief valve 38, but the accumulator may be omitted. The oil pump 34 is provided in a supply conduit 40 connected to the reservoir 33 at one end, and is driven by an electric motor 42 to pump the brake oil from the reservoir 33 to discharge a high pressure brake oil. A connection conduit 44 is connected between the supply conduit 40 on the discharge side of the oil pump 34 and the regulator 30, and the accumulator 36 is connected to the connection conduit 44. When a pressure in the connecting conduit 44 exceeds a preset relief pressure, the relief valve 3S returns the brake oil in the connecting conduit 44 to the supply conduit 40 on the side of the reservoir 33 relative to the oil pump 34, thereby to adjust the pressure in the connecting conduit 44 to be equal to or lower than the relief pressure.

The master cylinder 28 and the regulator 30 are connected to a supply conduit 50 common to the left and right front wheels and the left and right rear wheels provided in the upstream braking actuator 12 by a first supply conduit 46 and a second supply conduit 48, respectively. The master cut valves 22F and 22R are normally open type electromagnetic on-off valves provided in the first supply conduit 46 and the second supply conduit 48, respectively. A stroke simulator 54 is connected to the first supply conduit 46 by a connection conduit 52 and a connection control valve 56 which is a normally closed type electromagnetic on-off valve is provided in the connection conduit 52. The connection control valve 56 opens when the master cut valves 22F and 22R are closed, thereby permitting the driver to depress the brake pedal 32, and applying a pedaling reaction force to the driver via the brake pedal 32.

The upstream pressure control valve 24 includes a pressure increasing control valve 24I and a pressure decreasing control valve 24D which are normally closed electromagnetic differential pressure control valves. The other end of the supply conduit 40 is connected to the supply conduit 50 and the pressure increasing control valve 24I is provided in the supply conduit 40 on the discharge side of the oil pump 34. The supply conduit 50 is connected to a discharge conduit 60 connected to the reservoir 33 at one end by a connection conduit 58 and the pressure decreasing control valve 24D is provided in the connection conduit 58. The pressure increasing control valve 24I and the pressure decreasing control valve 24D may each be, for example, a linear solenoid valve configured to open as necessary when the master cut valves 22F and 22R are closed, and to increase an opening amount as an amount of current flowing to a solenoid (not shown) increases. As shown in FIG. 1, the upstream braking actuator 12 set an upstream pressure Pu to a pressure in the master cylinder 28 when the master cut valves 22F and 22R are opened and the pressure increasing control valve 24I, the pressure decreasing control valve 24O and the connection control valve 56 are closed.

When an opening amount of the pressure increasing control valve 24I increases, a flow rate of the oil flowing from the hydraulic pressure supply source 20 via the supply conduit 40 to the supply conduit 50 increases, and a pressure in the supply conduit 50 increases (pressure increasing mode). On the other hand, as an opening amount of the pressure decreasing control valve 24D increases, a flow rate of the oil flowing from the supply conduit 50 via the connecting conduit 58 to the discharge conduit 60 increases and the pressure in the supply conduit 50 decreases (pressure decreasing mode). Furthermore, when the pressure increasing control valve 24I and the pressure decreasing control valve 24D are in the closed state, the pressure in the supply conduit 50 does not change (pressure holding mode). Accordingly, the upstream braking actuator 12 can control, in the modes of the pressure increasing mode, the pressure decreasing mode and the pressure holding mode, an upstream pressure Pu supplied from the upstream braking actuator to the downstream braking actuator in a state in which the communication between the master cylinder device 18 and the downstream braking actuator 14 is cut off.

The supply conduit 50 includes a supply conduit 50F common to the left and right front wheels 51FL and 51FR and a supply conduit 50R common to the left and right rear wheels 51RL and 51RR. An intermediate supply conduit 50M is provided between the supply conduits 50F and 50R and is provided with a communication control valve 62. The communication control valve 62 is a normally closed type electromagnetic on-off valve, which is opened when the master cut valves 22F and 22R are closed, thereby connecting the supply conduit 50F common to the left and right front wheels and the supply conduit 50R common to the left and right rear wheels. The left and right front wheels 51FL and 51FR constitute a front wheel group and the left and right rear wheels 51RL and 51RR constitute a rear wheel group.

One ends of a left front wheel control conduit 64FL and a right front wheel control conduit 64FR are connected to the supply conduit 50F. The other ends of these control conduits are connected to the discharge conduit 60. The control conduit 64FL is provided with a pressure increasing-holding valve 66FL and a pressure decreasing valve 68FL for the left front wheel, and the control conduit 64FR is provided with a pressure increasing-holding valve 66FR and a pressure decreasing valve 68FR for the right front wheel. Similarly, one ends of a left rear wheel control conduit 64RL and a right rear wheel control conduit 64RR are connected to the supply conduit 50R, and the other ends of these control conduits are connected to the discharge conduit 60. The control conduit 64RL is provided with a pressure increasing-holding valve 66RL and a pressure decreasing valve 68RL for the rear left wheel. The control conduit 64RR is provided with a pressure increasing-holding valve 66RR and a pressure decreasing valve 68RR for the right rear wheel.

Although not shown in detail in FIG. 1, braking force generating devices 70FL and 70FR are provided corresponding to the left and right front wheels 51FL and 51FR, and braking force generating devices 70RL and 70RR are provided corresponding to the left and right rear wheels 51RL and 51RR. The braking force generating devices 70FL to 70RR include, respectively, brake discs 72FL to 72RR rotating together with corresponding wheels and brake calipers 74FL to 74RR pressing brake pads against the corresponding brake discs. The brake calipers 74FL to 74RR include wheel cylinders 76FL to 76RR, respectively, and change pressing forces of the brake pads against the brake disks according to pressures in the wheel cylinders, that is, braking pressures Pwfl to Pwrr, to convert the braking pressures into the braking forces, and generate braking forces corresponding to the braking pressures. The braking force generating devices may be drum-type braking force generating devices.

In the embodiment, since the ground contact loads of the left and right front wheels 51FL and 51FR are higher than the ground contact loads of the left and right rear wheels 51RL and 51RR, a front-rear wheel distribution ratio of the braking forces is set toward the front wheels. Except in the case where the braking pressures of the respective wheels are individually controlled as in the anti-skid control, the braking pressures Pwfl and Pwfr of the left and right front wheels 51FL and 51FR are controlled to the same front wheel braking pressure Pwf, and the braking pressures Pwrl and Pwrr of the left and right rear wheels 51RL and 51RR are controlled to the same rear wheel braking pressure Pwr.

In a situation where the vehicle is braked while traveling on a road with a high coefficient of friction on the road surface, a locking pressure of the front wheels 51FL and 51FR is higher than a locking pressure of the rear wheels 51RL and 51RR. Therefore, the front wheels 51FL and 51FR are high pressure wheels and the rear wheels 51RL and 51RR are low pressure wheels. Also, a locking pressure Plof of the front wheels is higher than a locking pressure Plor of the rear wheels. However, in a situation where the vehicle is braked while turning on a road having a low coefficient of friction on the road surface, since a margin of a longitudinal force of the front wheels, which are the steerable wheels, is small, a locking pressure of the front wheels is lower than a locking pressure of the rear wheels. Therefore, the front wheels 51FL and 51FR are low pressure wheels and the rear wheels 51RL and 51RR are high pressure wheels. The locking pressures decrease as the friction coefficient of the road surface decreases and increase as the ground contact loads of the wheels increase.

One end of a supply/discharge conduit 78FL is connected to the control conduit 64FL between the pressure increasing-holding valve 66FL and the pressure decreasing valve 68FL for the front left wheel, and the other end of the supply/discharge conduit 78FL is connected to the wheel cylinder 76FL of the braking force generating device 70FL. One end of a supply/discharge conduit 78FR is connected to the control conduit 64FR between the pressure increasing-holding valve 66FR and the pressure decreasing valve 68FR for the right front wheel, and the other end of the supply/discharge conduit 78FR is connected to the wheel cylinder 76FR of the braking force generating device 76FR. One end of a supply/discharge conduit 78RL is connected to the control conduit 64RL between the pressure increasing-holding valve 66RL and the pressure decreasing valve 68RL for the left rear wheel, and the other end of the supply/discharge conduit 78RL is connected to the wheel cylinder 76RL of the braking force generating device 70RL. One end of a supply/discharge conduit 78RR is connected to the control conduit 64RR between the pressure increasing-holding valve 66RR and the pressure decreasing valve 68RR for the right rear wheel, and the other end of the supply/discharge conduit 78RR is connected to the wheel cylinder 76RR of the braking force generating device 70RR.

Each of the pressure increasing-holding valves 66FL to 66RR and the pressure decreasing valves 68FL to 66RR functions as a pressure increasing/decreasing control valve that increases, holds, and decreases the braking pressure of the corresponding wheel. As shown in FIG. 1, The downstream braking actuator 14 controls braking pressures Pwfl to Pwrr of the corresponding wheels in the pressure increasing mode by opening the pressure increasing-holding valves 66FL to 66RR and closing the pressure decreasing valves 68FL to 68RR. The downstream braking actuator 14 controls the braking pressures Pwfl to Pwrr of the corresponding wheels in the pressure decreasing mode by closing the pressure increasing-holding valves 66FL to 66RR and opening the pressure decreasing valves 68FL to 68RR. Further, the downstream braking actuator 14 controls braking pressures Pwfl to Pwrr of the corresponding wheels in the pressure holding mode by closing the pressure increasing-holding valves 66FL to 66RR and closing the pressure decreasing valves 68FL to 68RR, that is, by shutting off communication between the hydraulic pressure supply source 20 and the downstream braking actuator 14. In the embodiment, the pressure increasing-holding valves 66FL to 66RR are normally open type electromagnetic on-off valves, and an open position is the standard position. On the other hand, the pressure decreasing valves 68FL to 66RR are normally closed type electromagnetic on-off valves, and a closed position is the standard position. However, the pressure increasing-holding valve and the pressure decreasing valve of each wheel may be replaced by one solenoid valve of three-port three-position switching type capable of increasing, holding and decreasing the braking pressure. In addition, the pressure increasing-holding valves 66FL to 66RR may each be a linear solenoid valve configured such that an opening amount decreases as an amount of current flowing to the solenoid increases.

The brake pedal 32 is provided with a pedal effort sensor 80 for detecting a pedal effort Fp applied to the brake pedal by the driver. A signal indicating the pedal effort Fp detected by the pedal effort sensor 80 is input to the electronic control unit 16. The pedal effort Fp is a value indicating a braking operation amount of the driver, but a master cylinder pressure Pm which is a pressure in the master cylinder 28 or a pressure in the first supply conduit 46 between the master cylinder and the master cut valve 22F may be detected as a braking operation amount of the driver.

The supply conduit 40 between the oil pump 34 and the pressure increasing control valve 24I is connected with a pressure sensor 84 for detecting a pressure in the supply conduit (accumulator pressure Pa). A pressure sensor 86 that detects a pressure (upstream pressure Pu) in the supply conduit 50F is connected to the supply conduit. Signals indicating the accumulator pressure Pa and the upstream pressure Pu detected by the pressure sensors 84 and 86, respectively, are also input to the electronic control unit 16. Further, signals indicating various parameters relating to a running condition of the vehicle, such as a steering angle θ and a vehicle speed V, are also input from the other sensors 88 to the electronic control unit 16.

The electronic control unit 16 may be a microcomputer having, for example, a CPU, a ROM, a RAM, and an input/output port unit, which are connected to each other by a bi-directional common bus. The ROM stores control programs of the upstream braking actuator 12 and the downstream braking actuator 14 corresponding to the flowcharts shown in FIGS. 2-6. The CPU controls the upstream braking actuator 12 and the downstream braking actuator 14 according to the control programs, as will be described in detail later.

In particular, in the embodiment, control of the braking forces by the antiskid control (that is expressed as "ABS control" in the drawing), that is, control of the braking forces by the control modes of the pressure decreasing mode, the pressure holding mode, the pressure increasing mode and the non-control mode is performed by the control program of the downstream braking actuator 14. Further, when it is impossible to reduce a braking pressure as in a case where the pressure decreasing valve of any one of the wheels remains closed and cannot be opened, it is determined that the downstream braking actuator 14 is in the specific abnormality. In a braking force control apparatus in which a braking pressure is decreased by suction of an oil pump, even when the oil pump or an electric motor for driving the oil pump malfunctions, it is determined that the downstream braking actuator 14 is in the specific abnormality.

When the downstream braking actuator 14 is in the specific abnormality, as will be described in detail later, the braking forces are controlled by the alternative anti-skid control according to the flowcharts shown in FIGS. 3 to 6. In the alternative anti-skid control, when a braking operation amount of the driver is large, the braking pressures Pwrl and Pwrr of the rear wheels are controlled so as to be the same pressure Pwr that does not exceed the locking pressure Plor of the rear wheels. On the other hand, the braking pressures Pwfl and Pwfr of the front wheels are controlled so as to be the same pressure Pwf that does not exceed the locking pressure Plof of the front wheels and is not as lower as possible than the locking pressure of the rear wheels.

<Control of Upstream Braking Actuator 12 and Downstream Braking Actuator 14>

Figure 2:
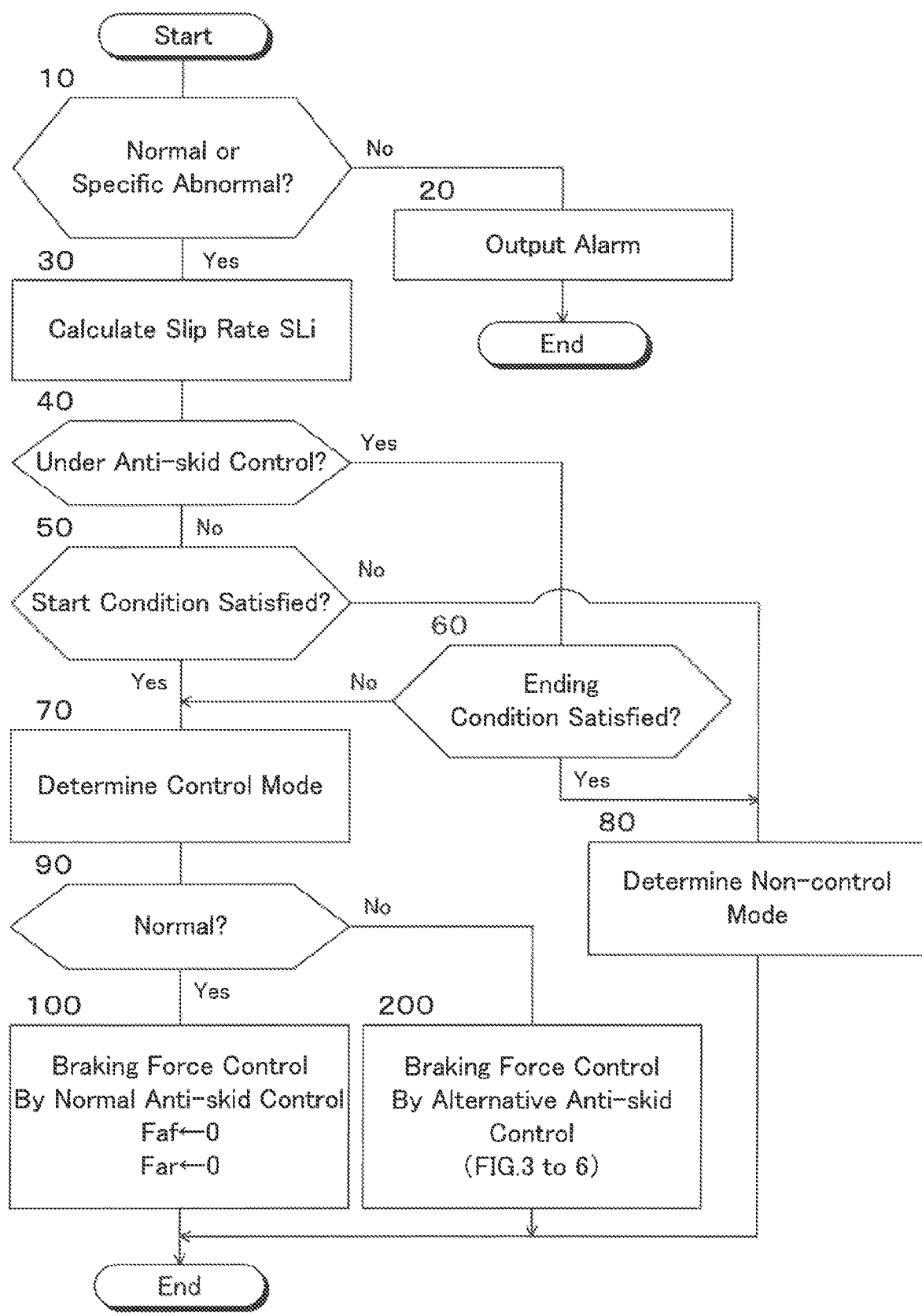
FIG. 2 is a flowchart showing a control routine of an upstream braking actuator in the first embodiment.
Figure 3:
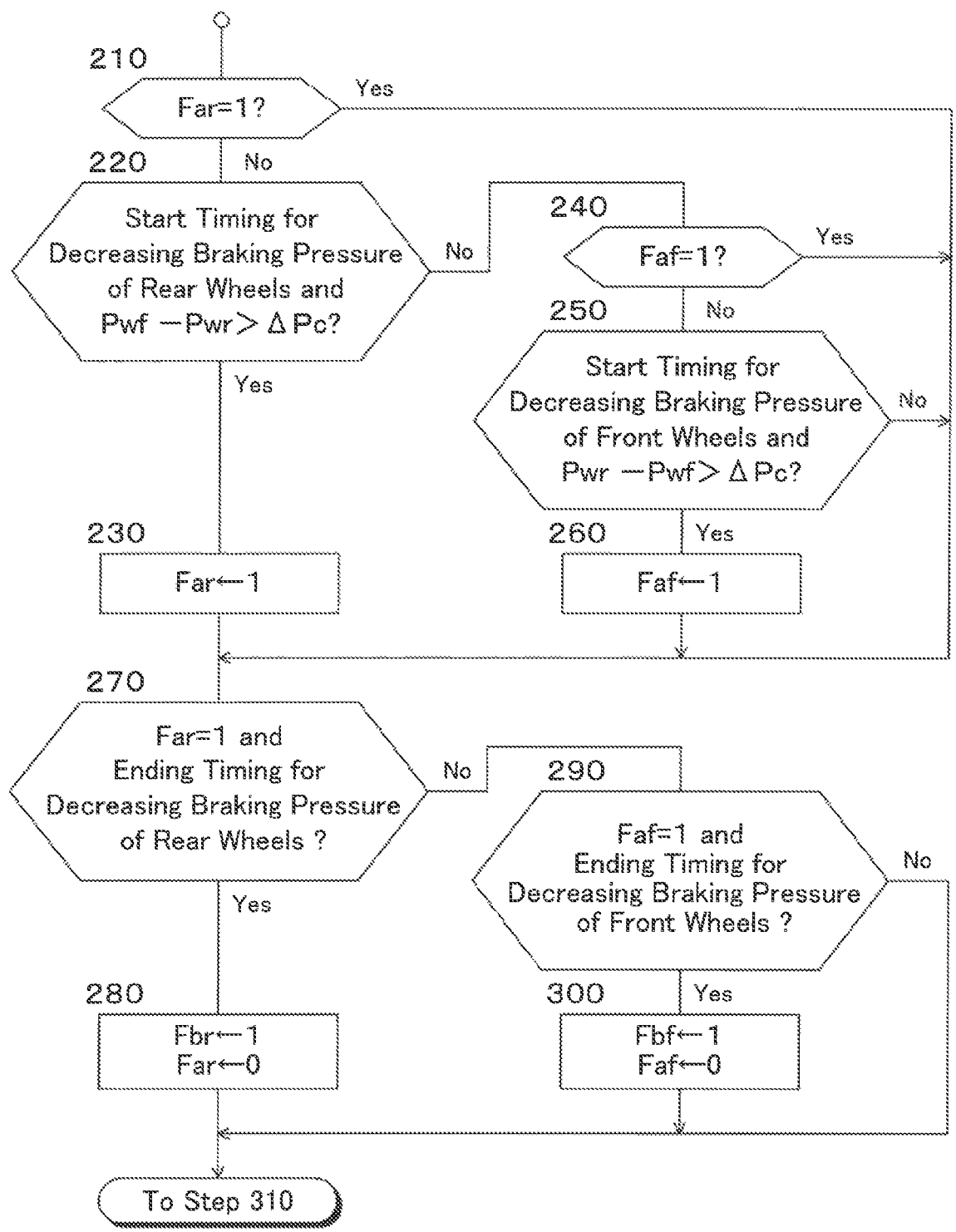
FIG. 3 is a flow chart showing a first part of an alternative anti-skid control subroutine executed in step 200 of the flow chart shown in FIG. 2.
Figure 4:
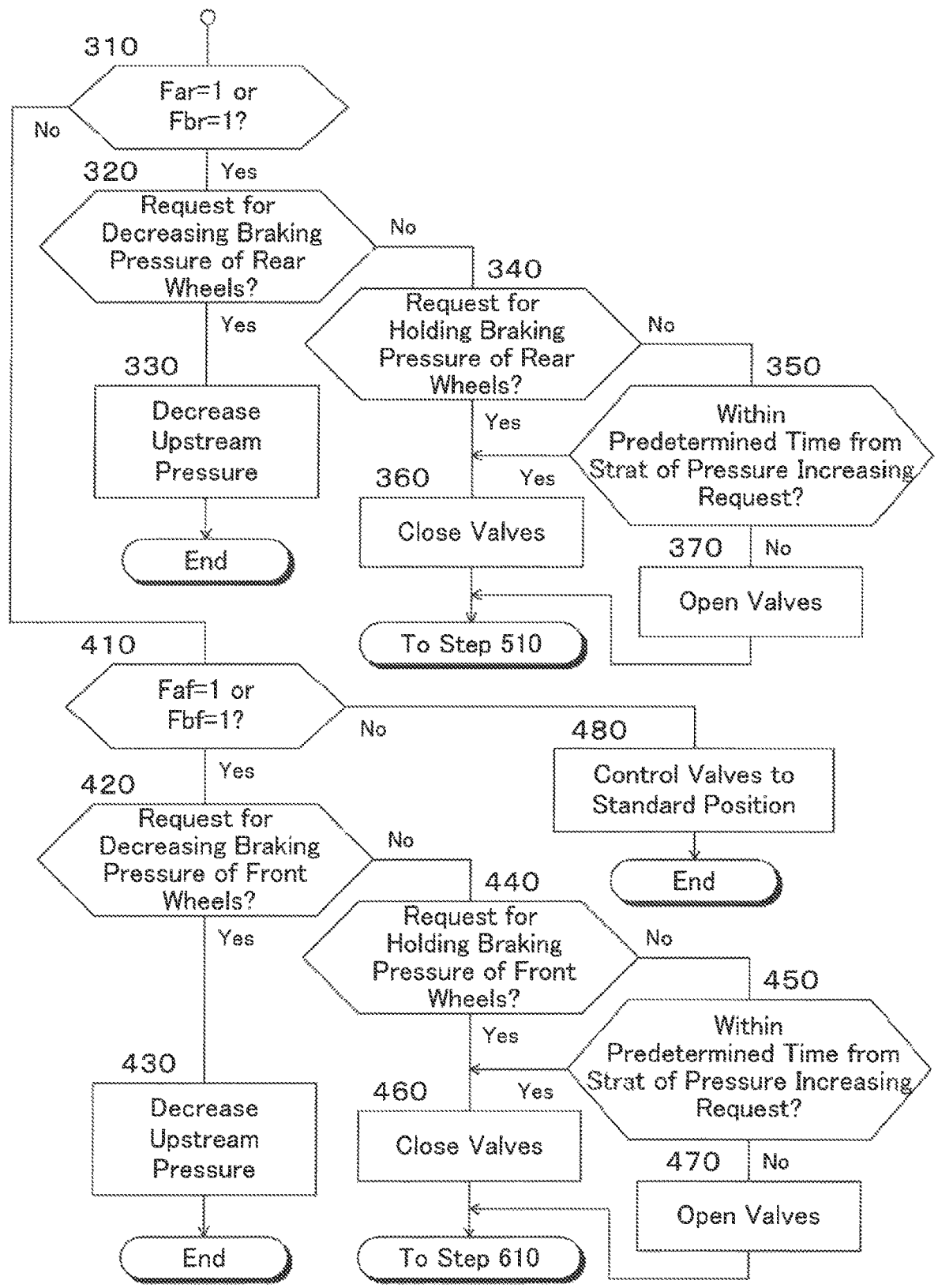
FIG. 4 is a flow chart showing a second part of the alternative anti-skid control subroutine executed in step 200 of the flow chart shown in FIG. 2.
Figure 5:
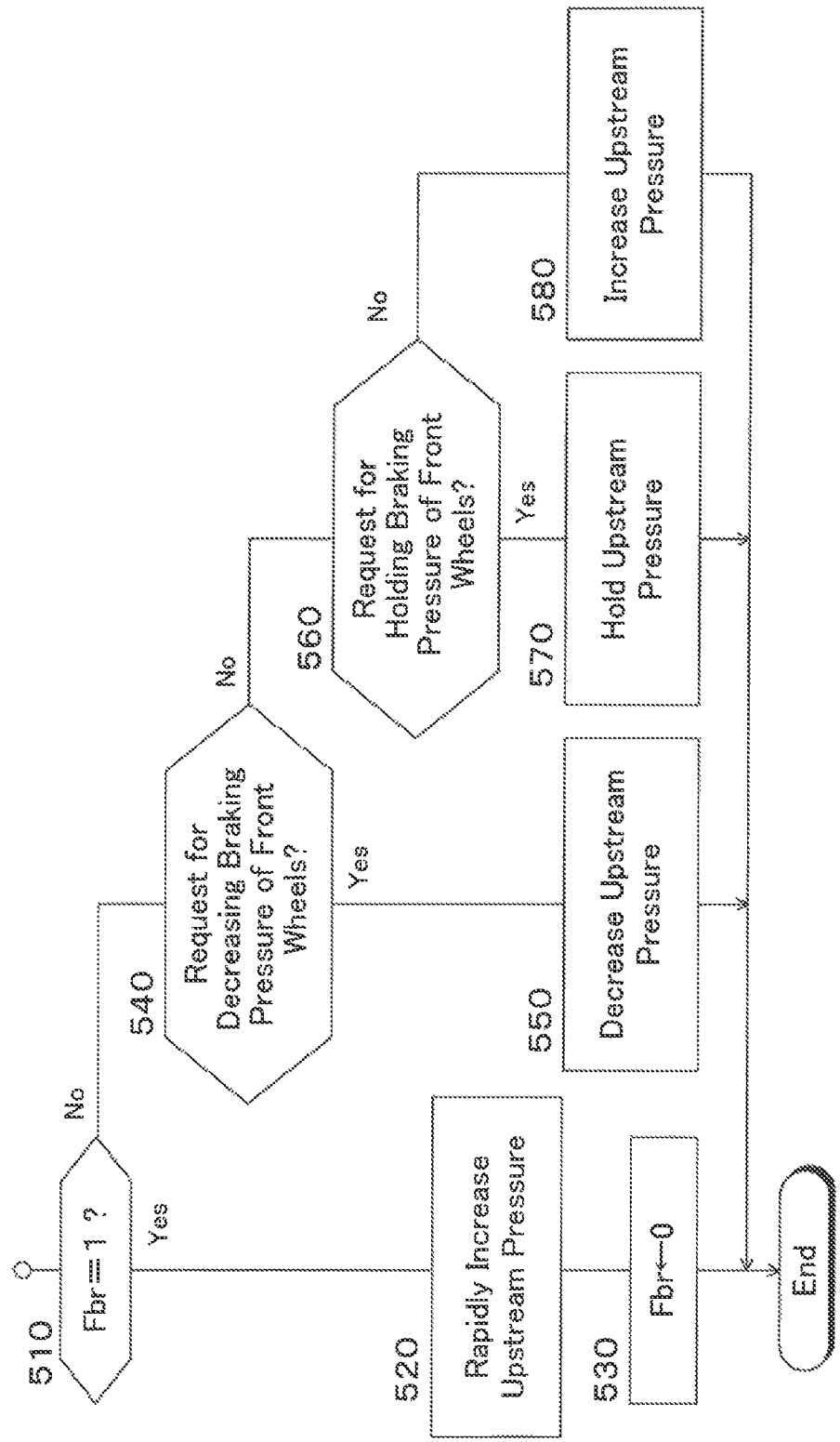
FIG. 5 is a flow chart showing a third part of the alternative anti-skid control subroutine executed in step 200 of the flow chart shown in FIG. 2.
Figure 6:
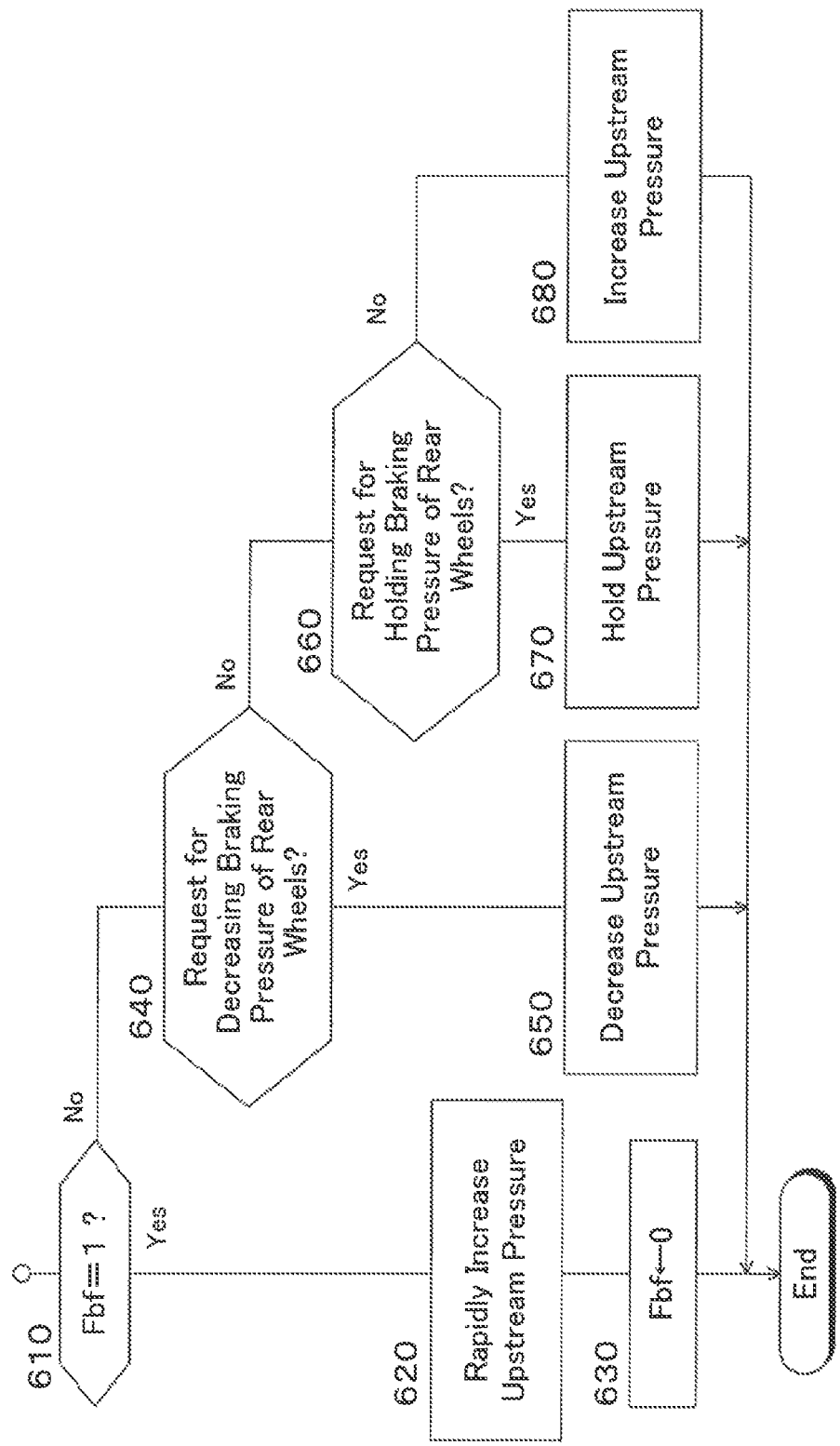
FIG. 6 is a flow chart showing a fourth part of the alternative anti-skid control subroutine executed in step 200 of the flow chart shown in FIG. 2.

Next, the control routine of the upstream braking actuator 12 and the downstream braking actuator 14 in the embodiment will be described with reference to the flowchart shown in FIG. 2. The control according to the flowchart shown in FIG. 2 is repeatedly executed at predetermined time intervals, for example, in the order of the left front wheel 51FL, the right front wheel 51FR, the left rear wheel 51RL and the right rear wheel 51RR when an ignition switch (not shown) is ON. In the following description, the control of the upstream braking actuator and the downstream braking actuator according to the flowchart shown in FIG. 2 is simply referred to as "the control".

First, in step 10, it is determined whether or not the downstream braking actuator 14 is normal or in the specific abnormality. In this step, when the pressure increasing-holding valves 66FL to 66RR and the pressure decreasing valves 68FL to 68RR of all the wheels can normally be opened and closed, it is determined that the downstream braking actuator 14 is normal. When an affirmative determination is made, the control proceeds to step 30, and when a negative determination is made, that is, when it is determined that the downstream braking actuator 14 is abnormal other than in the specific abnormality, the control proceeds to step 20.

Incidentally, at the start of the control, flags Faf, Far, Fbf and Fbr, which will be described later, are reset to 0. Further, prior to step 10, signals indicating the wheel speeds Vwi or the like detected by the sensors may be read in, or necessary signals may be read in advance of execution of each step.

In step 20, an alarm device (not shown in FIG. 1) is operated, so that an alarm indicating that the downstream braking actuator 14 is abnormal other than in the specific abnormality is outputted, and then the control is once ended. Since the pressure increasing-holding valves 66FL to 66RR and the pressure decreasing valves 68FL to 68RR are not controlled, in principle, the pressure increasing-holding valves 66FL to 66RR of all the wheels are set to the open positions and the pressure decreasing valves 68FL to 68RR are set to the closed positions.

In step 30, an estimated vehicle speed Vb is calculated based on wheel speeds Vwi (i=fl, fr, rl and rr) in a manner known in the art. Further, braking slip rates SLi (i=fl, fr, rl or rr) of the wheels are calculated based on the estimated vehicle speed Vb and the wheel speeds Vwi.

In step 40, it is determined whether or not braking force control by the anti-skid control is being performed for the relevant wheel. When an affirmative determination is made, the control proceeds to step 60, and when a negative determination is made, the control proceeds to step 50.

In step 50, a determination is made as to whether or not the condition for starting the control of the braking force by the anti-skid control is satisfied for the relevant wheel. For example, it is determined whether or not the estimated vehicle speed Vb is equal to or greater than a control start reference value Vbs (a positive constant) and a braking slip rate SLi of the relevant wheel is equal to or greater than a reference value SLo (a positive constant). When a negative determination is made, the control proceeds to step 80, and when an affirmative determination is made, the control proceeds to step 70.

In step 60, it is determined whether or not the condition for ending the control of the braking force by the anti-skid control is satisfied for the relevant wheel. When an affirmative determination is made, the control proceeds to step 80, and when a negative determination is made, the control proceeds to step 70.

In step 70, based on the braking slip rate SLi of the wheel, a determination is made in a manner known in the art as to whether the control mode for bringing the braking slip ratio to a value within the predetermined range is the pressure increasing mode, the pressure holding mode or the pressure decreasing mode. Further, for example, a target duty ratio Dti (i=fl, fr, rl or rr) of the pressure increasing-holding valve or the pressure decreasing valve of the wheel is calculated based on a deceleration Gxb of the vehicle calculated based on a longitudinal acceleration Gx of the vehicle, the control mode and the braking slip rate SLi of the relevant wheel.

In step 80, the downstream braking actuator 14 is controlled in the non-control mode. That is, the pressure increasing-holding valves 66FL to 66RR of the relevant wheel are controlled to the open position, and the pressure decreasing valves 68FL to 68RR are controlled to the closed position.

In step 90, it is determined whether or not the downstream braking actuator 14 is normal. When a negative determination is made, that is, when the downstream braking actuator 14 is in the specific abnormality, the control proceeds to step 200, and when an affirmative determination is made, the control proceeds to step 100.

In step 100, control of the braking force by a normal anti-skid control is performed. That is, by duty ratio control of the pressure increasing-holding valves 66FL to 66RR or the pressure decreasing valves 68FL to 68RR of the relevant wheel in accordance with the control mode and the target duty ratio Dti determined and calculated in step 70, the braking pressure is controlled to be an appropriate value. It is to be noted that braking force control by the normal anti-skid control may be performed in any manner known in the art.

Furthermore, in step 100, the flags Faf and Far regarding whether there is a request for special pressure increase of the upstream pressure Pu are reset to 0. The facts that the flags Faf and Far are 1 and 0 respectively indicate that there is a request for special pressure increase of the upstream pressure Pu and there is no request for special pressure increase of the upstream pressure.

In step 200, in accordance with the flowcharts shown in FIGS. 3 to 6, as will be described in detail later, the braking force is controlled by the alternative anti-skid control when the downstream braking actuator 14 is in the specific abnormality.

<Control of Braking Force by Alternative Anti-Skid Control>

Next, with reference to the flowcharts shown in FIGS. 3 to 6, the control of the braking force by the alternative anti-skid control executed in step 200 will be described in detail.

In step 210, it is determined whether or not the flag Far is 1, that is, whether or not there is a request for special pressure increase of the upstream pressure Pu. When an affirmative determination is made, the control proceeds to step 270, and when a negative determination is made, the control proceeds to step 220.

In step 220, a determination is made as to whether or not it is the start timing of the request for decreasing the braking pressure Pwr of the rear wheels and a difference Pwf−Pwr between the braking pressure Pwf of the front wheels and the braking pressure Pwr of the rear wheels is larger than a reference value ΔPc (a positive constant). When a negative determination is made, the control proceeds to step 240, and when an affirmative determination is made the flag Far is set to 1 in step 230, and then the control proceeds to step 270. Notably, when the determination in step 70 for at least one of the left and right rear wheels has changed from the non-control mode to the pressure decreasing mode, it is determined that it is the start timing of the request for decreasing the braking pressure Pwr of the rear wheels.

In step 240, it is determined whether or not the flag Faf is 1, that is, whether or not there is a request for special pressure increase of the upstream pressure Pu. When an affirmative determination is made, the control proceeds to step 270, and when a negative determination is made, the control proceeds to step 250.

In step 250, it is determined whether or not the request for decreasing the braking pressure Pwf of the front wheels is started and whether or not a difference Pwr−Pwf between the braking pressure Pwr of the rear wheels and the braking pressure Pwf of the front wheels is larger than the reference value ΔPc. When a negative determination is made, the control proceeds to step 270, and when an affirmative determination is made, after the flag Faf is set to 1 in step 260, the control proceeds to step 270. Notably, when the determination in step 70 for at least one of the left and right front wheels has changed from the non-control mode to the pressure decreasing mode, it is determined that it is the start timing of the pressure decreasing request of the braking pressure Pwf of the front wheels.

In step 270, it is determined whether or not the flag Far is 1 and it is an ending timing of the pressure decreasing request for the braking pressure Pwr of the rear wheels. When a negative determination is made, the control proceeds to step 290, and when an affirmative determination is made, the control proceeds to step 280. Notably, when the determination in step 70 has changed from the pressure decreasing mode to a mode other than the pressure decreasing mode for at least one of the left and right rear wheels, it is determined that it is the ending timing of the request for decreasing the braking pressure Pwr of the rear wheels.

In step 280, the flag Fbr is set to 1 and the flag Far is reset to 0, after which the control proceeds to step 310. Notably, the fact that the flag Fbr is 1 indicates that there is a request for implementing special pressure increase of the upstream pressure Pu, and the fact that the flag Fbr is 0 indicates that there is no request for implementing special pressure increase of the upstream pressure.

In step 290, it is determined whether or not the flag Faf is 1 and it is an ending timing of the pressure decreasing request of the braking pressure Pwf of the front wheels. When a negative determination is made, the control proceeds to step 310, and when an affirmative determination is made, the control proceeds to step 300. Notably, when the determination in step 70 has changed from the pressure decreasing mode to a mode other than the pressure decreasing mode for at least one of the left and right front wheels, it is determined that it is the ending timing of the request for decreasing the braking pressure Pwf of the front wheels.

In step 300, the flag Fbf is set to 1 and the flag Faf is reset to 0, after which the control proceeds to step 310. Notably, the fact that the flag Fbf is 1 indicates that there is a request for implementing special pressure increase of the upstream pressure Pu, and the fact that the flag Fbf is 0 indicates that there is no request for implementing special pressure increase of the upstream pressure.

In step 310, it is determined whether or not the flag Far or Fbr is 1, that is, whether there is a request for a special pressure increase of the upstream pressure Pu or a request for implementing the special pressure increase. When a negative determination is made, the control proceeds to step 410, and when an affirmative determination is made, the control proceeds to step 320.

In step 320, it is determined whether or not there is a request for decreasing the braking pressure Pwr of the rear wheels, that is, whether or not the control mode of at least one of the left and right rear wheels determined in step 70 is the pressure decreasing mode. When a negative determination is made, the control proceeds to step 340, and when an affirmative determination is made, the control proceeds to step 330.

In step 330, the pressure increasing control valve 24I is closed and the pressure decreasing control valve 24D is opened, whereby the upstream pressure Pu is decreased, and the control is once terminated.

In step 340, it is determined whether or not there is a request for holding the braking pressure Pwr of the rear wheels, that is, it is determined whether or not both the control modes of the left and right rear wheels determined in step 70 are the pressure holding mode. When an affirmative determination is made, the control proceeds to step 360, and when a negative determination is made, the control proceeds to step 350.

In step 350, it is determined whether or not it is within a predetermined time ΔTc (a positive constant) from a time point when the request for increasing the braking pressure Pwr of the rear wheels is started. When a negative determination is made, the control proceeds to step 370, and when an affirmative determination is made, the control proceeds to step 360.

In step 350, the pressure increasing-holding valves 66RL and 66RR of the rear wheels 51RL and 51RR are closed, and in step 370, the pressure increasing-holding valves 66RL and 66RR of the rear wheels 51RL and 51RR are opened. Upon completion of step 360 or 370, the control proceeds to step 510.

In step 410, it is determined whether or not the flag Faf or Fbf is 1, that is, whether or not there is a request for a special pressure increase of the upstream pressure Pu or a request for implementing the special pressure increase. When a negative determination is made, the control proceeds to step 480, and when an affirmative determination is made, the control proceeds to step 420.

In step 420, it is determined whether or not there is a request for decreasing the braking pressure Pwf of the front wheels, that is, it is determined whether or not the control mode of at least one of the left and right front wheels determined in step 70 is the pressure decreasing mode. When a negative determination is made, the control proceeds to step 440, and when an affirmative determination is made, the control proceeds to step 430.

In step 430, the pressure increasing control valve 24I is closed and the pressure decreasing control valve 24D is opened, whereby the upstream pressure Pu is decreased, and the control is temporarily terminated.

In step 440, it is determined whether or not there is a request for holding the braking pressure Pwf of the front wheels, that is, it is determined whether or not both the control modes of the left and right front wheels determined in step 70 are the pressure holding mode. When an affirmative determination is made, the control proceeds to step 460, and when a negative determination is made, the control proceeds to step 450.

In step 450, it is determined whether or not it is within the predetermined time ΔTc from the time point when the request for increasing the braking pressure Pwf of the front wheels is started. When a negative determination is made, the control proceeds to step 470, and when an affirmative determination is made, the control proceeds to step 460.

In step 460, the pressure increasing-holding valves 66FL and 66FR of the front wheels 51FL and 51FR are closed, and in step 470, the pressure increasing-holding valves 66FL and 66FR of the front wheels 51FL and 51FR are opened. Upon completion of step 460 or 470, the control proceeds to step 610.

In step 480, each valve of the downstream braking actuator 14 is controlled to the standard position. That is, the pressure increasing-holding valves 66FL to 66RR of the relevant wheel are controlled to the open position, and the pressure decreasing valves 68FL to 68RR are controlled to the closed position.

In step 510, it is determined whether or not the flag Fbr is 1, that is, whether or not there is a request for performing special pressure increase of the upstream pressure Pu. When a negative determination is made, the control proceeds to step 540, and when an affirmative determination is made, the control proceeds to step 520.

In step 520, the pressure increasing control valve 24I is opened and the pressure decreasing control valve 24O is closed, so that the upstream pressure Pu is rapidly increased until the upstream pressure reaches the pressure at the time of starting pressure decreasing. Thereafter, in step 530, the flag Fbr is reset to 0. Notably, the pressure at the time of starting pressure decreasing may be the upstream pressure Pu estimated at the time of starting pressure decreasing.

In step 540, it is determined whether or not there is a request for decreasing the braking pressure Pwf of the front wheels, that is, it is determined whether or not the control mode of at least one of the left and right front wheels determined in step 70 is the pressure decreasing mode. When a negative determination is made, the control proceeds to step 560, and when an affirmative determination is made, the control proceeds to step 550.

In step 550, the pressure increasing control valve 24I is closed and the pressure decreasing control valve 24D is opened, so that the upstream pressure Pu is decreased.

In step 560, it is determined whether or not there is a request for holding the braking pressure Pwf of the front wheels, that is, it is determined whether or not both the control modes of the left and right front wheels determined in step 70 are the pressure holding mode. When a negative determination is made, the control proceeds to step 580, and when an affirmative determination is made, the control proceeds to step 570.

In step 570, the upstream pressure Pu is maintained by closing the pressure increasing control valve 24I and the pressure decreasing control valve 24O. In step 580, the pressure increasing control valve 24I is opened and the pressure decreasing control valve 24D is closed so that the upstream pressure Pu is increased.

In step 610, it is determined whether or not the flag Fbf is 1, that is, whether or not there is a request for performing special pressure increase of the upstream pressure Pu. When a negative determination is made, the control proceeds to step 640, and when an affirmative determination is made, the control proceeds to step 620.

In step 620, as in step 520, the pressure increasing control valve 24I is opened and the pressure decreasing control valve 24D is closed, whereby the upstream pressure Pu is rapidly increased. Thereafter, in step 630, the flag Fbf is reset to zero.

Steps 640 to 680 are executed in the same manner as steps 540 to 580, respectively. However, in step 640, it is determined whether or not there is a request for decreasing the braking pressure Pwr of the rear wheels, that is, it is determined whether the control mode of at least one of the left and right rear wheels determined in step 70 is the pressure decreasing mode. Further, in step 660, it is determined whether or not there is a request for holding the braking pressure Pwr of the rear wheels, that is, whether the control mode of both of the left and right rear wheels determined in step 70 is the pressure holding mode.

<Operation of Embodiment>

Next, the operation of the braking force control apparatus 10 according to the embodiment will be described with respect to various cases on the premise that the upstream braking actuator 12 is normal. When the upstream braking actuator 12 is abnormal, no control current is supplied to each valve or the like, and the upstream braking actuator 12 and the downstream braking actuator 14 are set in the state shown in FIG. 1 as much as possible, that is, in the non-control mode.

<A. When the Downstream Braking Actuator is Normal and a Steering Operation Amount by a Driver is Not Excessive>

In step 10, an affirmative determination is made, in steps 40 and 50, negative determinations are made, and in step 80, the downstream brake actuator 14 is controlled in the non-control mode. That is, the pressure increasing-holding valves 66FL to 66RR of the respective wheels are controlled to the open positions, and the pressure decreasing valves 68FL to 66RR are controlled to the closed positions. Therefore, the braking pressure Pwf of the front wheels becomes the master cylinder pressure Pm and the braking pressure Pwr of the rear wheels becomes the pressure in the regulator 30.

<B. When the Downstream Braking Actuator is Normal and the Steering Operation Amount by the Driver is Excessive>

In step 10, an affirmative determination is made. First, in steps 40 and 50, a negative determination and an affirmative determination are made, respectively, and then in steps 40 and 60, an affirmative determination and a negative determination are made, respectively. Therefore, in step 70 the control mode for setting the braking slip ratio SLi to a value within a predetermined range on the basis of the braking slip ratio is determined for each wheel as one of the pressure increasing mode, the pressure holding mode and the pressure decreasing mode.

Further, in step 90, an affirmative determination is made, and in step 100, the braking force is controlled by the normal anti-skid control so that the braking pressure of the wheel is controlled so as not to become locked. Therefore, it is possible to prevent all the wheels from becoming locked by controlling the braking forces by normal anti-skid control.

<C. When the Downstream Braking Actuator is in the Specific Abnormality and a Steering Operation Amount of the Driver is not Excessive>

In step 10, an affirmative determination is made, in steps 40 and 50, negative determinations are made, and in step 80, the downstream brake actuator 14 is controlled in the non-control mode. Therefore, since the braking force control by the alternative anti-skid control in step 200 is not performed, it is possible to prevent unnecessary control of the braking force by the alternative anti-skid control from being performed. The braking pressure Pwf of the front wheels becomes the master cylinder pressure Pm and the braking pressure Pwr of the rear wheels becomes the pressure in the regulator 30.

<D. When the Downstream Braking Actuator is in the Specific Abnormality and a Steering Operation Amount of the Driver is Excessive>

In step 10, an affirmative determination is made. First, in steps 40 and 50, a negative determination and an affirmative determination are made, respectively, and then in steps 40 and 60, an affirmative determination and a negative determination are made, respectively. Therefore, in step 70, the control mode for setting the braking slip ratio SLi to a value within a predetermined range on the basis of the braking slip ratio is determined for each wheel as one of the pressure increasing mode, the pressure holding mode and the pressure decreasing mode.

Further, in step 90, a negative determination is made, and in step 200, the braking forces are controlled by the alternative anti-skid control so that the braking pressures of all the wheels are controlled so as not to become locked.

<D-1> When the Lock Pressure of the Front Wheels is Higher than the Lock Pressure of the Rear Wheels:

In a situation where the vehicle is braked while traveling on a road having a high coefficient of friction on the road surface, braking slip ratios of the rear wheels become high earlier than braking slip ratios of the front wheels. That is, before the braking slip ratio SLfl or SLfr of the front wheels becomes equal to or higher than the reference value SLo, the braking slip ratio SLrl or SLrr of the rear wheels becomes equal to or higher than the reference value SLo. Therefore, a negative determination and an affirmative determination are made in steps 210 and 220, respectively, the flag Far is set to 1 in step 230, and negative determinations are made in steps 270 and 290. Further, in steps 310 and 320, affirmative determinations are made.

Therefore, among the left and right front wheels and the left and right rear wheels, the wheel group that includes the wheel whose braking control mode was changed from the non-control mode to the pressure decreasing mode by anti-skid control is the rear wheel group. Accordingly, it is determined that the rear wheels are the low pressure wheels (the other wheel group) and the front wheels are the high pressure wheels (one wheel group). Therefore, the lock pressure Plor of the rear wheels is lower than the lock pressure Plof of the front wheels. As will be described later, the braking pressure Pwf of the front wheels is higher than the braking pressure Pwr of the rear wheels except when the pressure decreasing of the upstream pressure Pu is completed.

Figure 7:
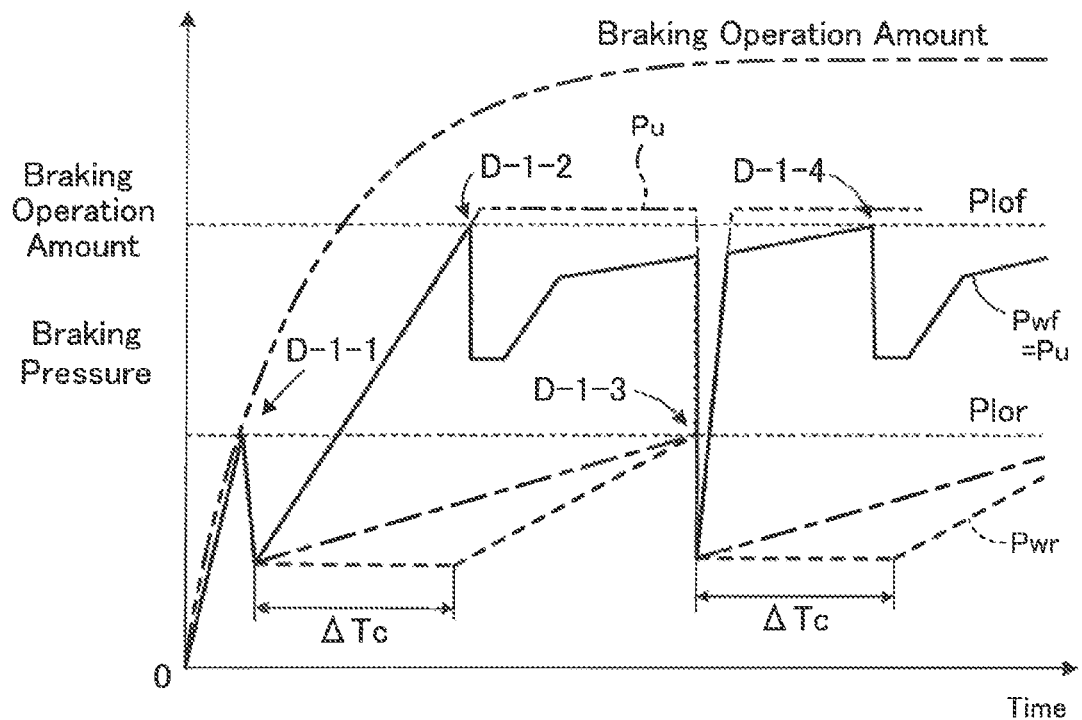
FIG. 7 is a view showing an operational example of the embodiment in a situation where a braking operation amount of a driver increases from zero to an excessive value for a case where left and right front wheels are high pressure wheels.

Next, as a specific example of the above-mentioned D-1, as shown in FIG. 7, the operation of the embodiment in a situation where a braking operation amount of a driver increases from zero to an excessive value will be described with respect to the cases D-1-1 to D-1-3 described below. Notably, in FIG. 7, the two-dot chain line indicates a braking operation amount of the driver, and the solid line and the broken line indicate a braking pressure Pwf of the front wheel and a braking pressure Pwr of the rear wheel, respectively. The upstream pressure Pu is substantially the same as the braking pressure Pwf of the front wheels. Further, in FIG. 7 and FIG. 8 to be described later, the difference between the lock pressures Plof and Plor is greatly exaggerated, and it is assumed that these locking pressures are constant.

<D-1-1> When the Braking Pressure Pwf of the Front Wheels and the Braking Pressure Pwr of the Rear Wheels Increase from a Value Lower than the Lock Pressure Plor of the Rear Wheel, and the Rear Wheel is Locked:

As indicated by the arrow D-1-1 in FIG. 7, when the braking operation amount of the driver increases from zero, the braking pressure Pwf of the front wheels and the braking pressure Pwr of the rear wheels increase from a value less than the lock pressure Plor of the rear wheels as the braking operation amount of the driver increases. When the braking pressure Pwr of the rear wheels reaches the lock pressure Plor of the rear wheels, negative determinations are made in steps 40 and 50 for the left and right front wheels, and the control mode of the front wheels is decided to be the non-control mode in step 80. For at least one of the left and right rear wheels, a negative determination and an affirmative determination are made in steps 40 and 50, respectively. Therefore, in step 70, the control mode of at least one of the left and right rear wheels is decided to be the pressure decreasing mode.

In step 90, a negative determination is made, and a negative determination and an affirmative determination are made in steps 210 and 220, respectively. The flag Far is set to 1 in step 230, and negative determinations are made in steps 270 and 290. Further, affirmative determinations are made in steps 310 and 320, and in step 330, the upstream pressure Pu is decreased. As a result, the braking pressure Pwf of the front wheels and the braking pressure Pwr of the rear wheels decrease relatively quickly to a pressure lower than the lock pressure Plor of the rear wheels.

When the upstream pressure Pu, the braking pressure Pwf of the front wheels and the braking pressure Pwr of the rear wheels decrease, the control modes of the front wheels and the rear wheels are determined to be the pressure increasing mode in step 70. In steps 210 and 270, affirmative determinations are made, and in step 280, the flag Fbr is set to 1 and the flag Far is reset to 0. In step 310, an affirmative determination is made, negative determinations are made in steps 320 and 340. An affirmative determination is made in step 350, and in step 360, the pressure increasing-holding valves 66FL and 66FR of the left and right rear wheels are closed. Further, in steps 510, 540 and 560, negative determinations are made, and in step 580, the upstream pressure Pu is increased. Therefore, the braking pressure Pwr of the rear wheels is maintained, and the braking pressure Pwf of the front wheels is increased by increasing the pressure of the upstream pressure.

Therefore, the rear wheel can be prevented from entering the locked state by decreasing the braking pressure Pwr of the rear wheels. Furthermore, as compared to where the upstream pressure Pu is increased after the upstream pressure Pu is temporarily retained, the upstream pressure and the braking pressure Pwf of the front wheels are increased earlier to a pressure higher than the lock pressure Plor of the rear wheels, and the braking force of the entire vehicle can be increased at an earlier stage.

In the situation where the braking pressure Pwr of the rear wheels is maintained and the braking pressure Pwf of the front wheels is increased, in step 70, the control mode of the rear wheels is determined to be the pressure increasing mode. Therefore, since negative determinations are made in steps 320 and 340, an affirmative determination is made in step 350 until a predetermined time ΔTc elapses from the time point when the control mode of the rear wheels has changed from the pressure decreasing mode to the pressure increasing mode, and the braking pressure Pwr of the rear wheels is maintained at a constant pressure. When the predetermined time ΔTc elapses, a negative determination is made in step 350, and in step 370, the pressure increasing-holding valves 66RL and 66RR of the rear wheels 51RL and 51RR are opened so that the braking pressure Pwr of the rear wheels is gradually increased.

Therefore, as compared to where the braking pressure Pwr of the rear wheels is increased without being held when the decreasing of the upstream pressure Pu is completed, it is possible to effectively reduce the possibility that the rear wheels are locked in a situation where the braking pressure Pwf of the front wheels is increased by the increasing of the upstream pressure Pu.

<D-1-2> When the Braking Pressure Pwr of the Rear Wheels is Less than the Lock Pressure Plor of the Rear Wheels, and the Front Wheels Become Locked:

As indicated by the arrow D-1-2 in FIG. 7, when the braking pressure Pwr of the rear wheels is less than the locking pressure Plor of the rear wheels and the braking pressure Pwf of the front wheels becomes the lock pressure Plof of the front wheels, negative determinations are made in steps 40 and 50 for the left and right rear wheels, and in step 80, the control mode of the rear wheels is determined to be the non-control mode. However, for at least one of the left and right front wheels, a negative determination and an affirmative determination are made in steps 40 and 50, respectively. Therefore, in step 70, the control mode of at least one of the left and right front wheels is determined to be the pressure decreasing mode.

In step 90, a negative determination is made and in steps 210, 220 and 240, negative determinations are made. In step 250, an affirmative determination is made and in step 260, flag Faf is set to 1. In steps 270 and 290, negative determinations are made and in step 310, a negative determination is made. In steps 410 and 420, affirmative determinations are made and in step 430, the upstream pressure Pu is decreased. As a result, the upstream pressure Pu and the braking pressure Pwf of the front wheels are rapidly reduced to a pressure higher than the lock pressure Plor of the rear wheels and lower than the lock pressure Plof of the front wheels. Thereafter, the upstream pressure Pu and the braking pressure Pwf of the front wheels are controlled in the control mode determined in step 70.

Therefore, even if there arises a possibility that the front wheels may become locked in a situation where there is no possibility of the rear wheels becoming locked, it is possible to prevent the front wheels from becoming locked by decreasing of the upstream pressure Pu. Further, the braking force of the entire vehicle can be increased by increasing the braking force of the front wheels as compared to where the upstream pressure Pu and the braking pressure Pwf of the front wheels are decreased to a pressure lower than the lock pressure Plor of the rear wheels so that the vehicle can be effectively braked.

<D-1-3> When the Braking Pressure Pwf of the Front Wheels is Equal to or Higher than the Lock Pressure Plor of the Rear Wheels and Less than the Lock Pressure Plof of the Front Wheels, and the Rear Wheels Become Locked:

As indicated by the arrow D-1-3 in FIG. 7, when the braking pressure Pwr of the rear wheels becomes the lock pressure Plor of the rear wheels in a situation where the braking pressure Pwf of the front wheels is equal to or higher than the lock pressure Plor of the rear wheels and lower than the lock pressure Plof of the front wheels, for the left and right front wheels, in steps 40 and 50, negative determinations are made, and in step 80, the control mode of the front wheels is determined to be the non-control mode. However, for at least one of the left and right rear wheels, a negative determination and an affirmative determination are made in steps 40 and 50, respectively. Therefore, in step 70, the control mode of at least one of the left and right rear wheels is determined to be the pressure decreasing mode.

In step 90, a negative determination is made, and in steps 210 and 220, a negative determination and an affirmative determination are made respectively. In step 230, flag Far is set to 1. In steps 270 and 290, negative determinations are made, but in steps 310 and 320, affirmative determinations are made and in step 330, the upstream pressure Pu is decreased. As a result, the braking pressure Pwf of the front wheels and the braking pressure Pwr of the rear wheels are steeply decreased to a pressure lower than the locking pressure Plor of the rear wheels. Therefore, in a situation where there is no possibility of the front wheels becoming locked, it is possible to prevent the rear wheels from entering the locked state by decreasing the upstream pressure Pu.

When the upstream pressure Pu, the braking pressure Pwf of the front wheels and the braking pressure Pwr of the rear wheels have been decreased, the control modes of the front wheels and the rear wheels are determined to be the pressure increasing mode in step 70. In steps 210 and 270, affirmative determinations are made, and in step 280, the flag Fbr is set to 1 and the flag Far is reset to 0. In step 310, an affirmative determination is made and in steps 320 and 340, negative determinations are made. In step 350, an affirmative determination is made and in step 360, the pressure increasing-holding valves 66RL and 66RR of the left and right rear wheels are closed. Further, in step 510, an affirmative determination is made and in step 520, the upstream pressure Pu is rapidly increased. Therefore, the braking pressure Pwr of the rear wheels is held, and the braking pressure Pwf of the front wheels is rapidly increased by the rapid increase of the upstream pressure.

Accordingly, as in the case D-1, as compared to where the braking pressure Pwr of the rear wheels is increased without being held when the decreasing of the upstream pressure Pu has been completed, it is possible to effectively reduce the possibility that the rear wheels are locked in a situation where the braking pressure Pwf of the front wheels is increased by increasing the upstream pressure Pu.

Further, in step 520, the upstream pressure Pu is rapidly increased until it reaches a value that the pressure took at the start of the pressure decreasing. In this case, the pressure increase gradient of the upstream pressure Pu is larger than the pressure increase gradient in the case D-1-1. Notably, when the rapid pressure increase of the upstream pressure Pu has been completed, the upstream pressure Pu is controlled in accordance with the determination of the control mode of the front wheels in step 70, and the braking pressure Pwf of the front wheels changes according to the change of the upstream pressure Pu.

Therefore, as compared to where the upstream pressure Pu is increased at the same pressure increase gradient as in the case D-1-1, the upstream pressure Pu and the braking pressure Pwf of the front wheels are more promptly increased, so that the braking forces of the front wheels can be recovered at an earlier stage. Further, since the upstream pressure Pu is rapidly increased until the pressure at the start of the pressure decreasing is reached, it is possible to prevent the upstream pressure Pu and the braking pressure Pwf of the front wheels from being excessively increased and the pressure increase amounts of the upstream pressure Pu and the wheel braking pressure Pwf of the front from being insufficient.

As in the case D-1-1 above, in the situation where the braking pressure Pwr of the rear wheels is maintained and the braking pressure Pwf of the front wheels is increased, in step 70, the control mode of the rear wheels may be determined to be the pressure increasing mode. In that case, since negative determinations are made in steps 320 and 340, in step 350, an affirmative determination is made in step 350 until a predetermined time ΔTc elapses from the time point when the control mode of the rear wheels has changed from the pressure decreasing mode to the pressure increasing mode, and the braking pressure Pwr of the rear wheels is maintained at a constant pressure. When the predetermined time ΔTc elapses, a negative determination is made in step 350, and in step 370, the braking pressure Pwr of the rear wheels is gradually increased.

Incidentally, in the situation indicated by the arrow D-1-4 in FIG. 7 the upstream pressure Pu, the braking pressure Pwf (=upstream pressure Pu) of the front wheels, and the braking pressure Pwr of the rear wheels are controlled in the same manner as in the case D-1-2 described above.

<D-2> When the Lock Pressure of the Front Wheels is Lower than the Lock Pressure of the Rear Wheels:

A braking slip ratio of the front wheels becomes high earlier than a braking slip ratio of the rear wheels in a situation where the vehicle is braked while turning on a road having a low friction coefficient of the road surface. That is, a braking slip ratio SLfl or SLfr of a front wheel becomes equal to or higher than the reference value SLo before a braking slip ratio SLrl or SLrr of a rear wheel becomes equal to or higher than the reference value SLo. Therefore, in steps 210 and 220, negative determinations are made and in steps 240 and 250, a negative determination and an affirmative determination are made, respectively. In step 260, the flag Faf is set to 1 and in steps 270 and 290, negative determinations are made. Further, in step 310, a negative determination is made and in steps 410 and 420, affirmative determinations are made.

Therefore, of the left and right front wheels and the left and right rear wheels, the wheel group that includes the wheel whose braking control mode was changed from the non-control mode to the pressure decreasing mode by anti-skid control is the front wheel group. Accordingly, it is determined that the front wheels are the low pressure wheels (the other wheel) and the rear wheels are the high pressure wheels (one wheel). Therefore, the lock pressure Plot of the front wheels is lower than the lock pressure Plor of the rear wheels.

Although not shown in the drawings, when the lock pressure Plof of the front wheels is lower than the lock pressure Plor of the rear wheels, the upstream pressure Pu, the braking pressure Pwf of the front wheels, and the braking pressure Pwr of the rear wheels (=upstream pressure Pu) are controlled in the same manner as the cases D-1-1 to D-1-4 described above, except that the front wheels and the rear wheels are interchanged. Therefore, the braking pressure Pwf of the front wheels is higher than the braking pressure Pwr of the rear wheels except at the time when the decrease of the upstream pressure Pu has been completed.

It is conceivable to control the upstream pressure Pu to be higher than a braking pressure of the high pressure wheels in a situation where the downstream braking actuator is in the specific abnormality and a braking operation amount of the driver is excessive. In that case, in order to prevent braking pressures of the high pressure wheels from exceeding the lock pressure of the high pressure wheels, it is necessary to control the pressure increasing-holding valves and the pressure decreasing valves of the high pressure wheels. On the other hand, according to the embodiment, the upstream pressure Pu is controlled to be the same value as the braking pressure of the high pressure wheels. Therefore, it is possible to control the braking pressure of the high pressure wheels to a pressure equal to or lower than the lock pressure of the high pressure wheels, without controlling the pressure increasing-holding valves and the pressure decreasing valves of the high pressure wheels.

<E. When the Downstream Braking Actuator 14 is Abnormal Other than in the Specific Abnormality>

In step 10, a negative determination is made and in step 20, an alarm indicating that the downstream brake actuator 14 is abnormal other than in the specific abnormality is output by operating the alarm device. Incidentally, it is ensured as much as possible that the master cylinder device 18 and the wheel cylinders 76FL to 76RR are connected to each other, and the braking force of each wheel changes corresponding to a braking operation amount of the driver.

Figure 8:
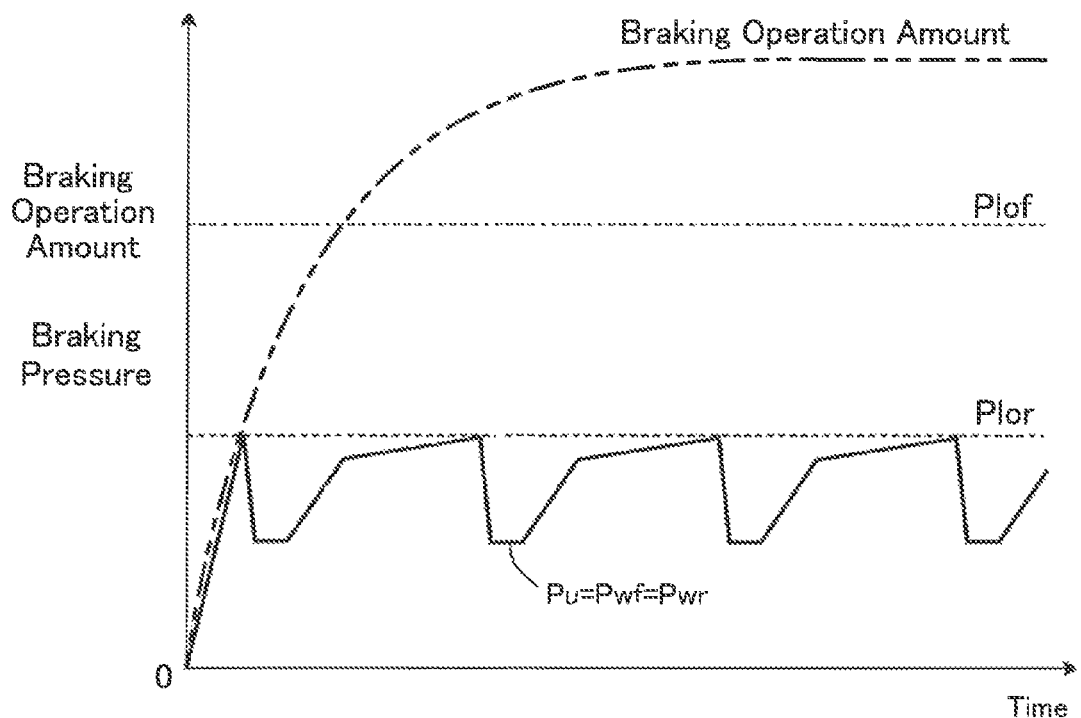
FIG. 8 is a view showing an operational example of a conventional control in a situation where a braking operation amount of a driver increases from zero to an excessive value for a case where left and right front wheels are high pressure wheels.

FIG. 8 is a view similar to FIG. 7 showing an example of conventional control in a situation where the lock pressure Plor of the rear wheels is lower than the lock pressure Plof of the front wheels and a steering operation amount of a driver increases from 0 to an excessive value. Since the lock pressure Plor of the rear wheels is lower than the lock pressure Plof of the front wheels, in the example of FIG. 8, if there arises a possibility that the rear wheels are locked, the upstream pressure Pu is decreased to a pressure lower than the lock pressure Plor of the rear wheels. Therefore, since the braking pressure Pwf of the front wheels cannot be increased to be equal to or higher than the lock pressure Plor of the rear wheels, the braking force of the entire vehicle cannot be increased by increasing the braking forces of the front wheels.

On the other hand, according to the embodiment, when the specific abnormality occurs in the downstream braking actuator 14, an alternative anti-skid control (step 200) is performed in a situation where the upstream pressure Pu is supplied to the braking force generating devices 70FL to 70RR of the wheels. In the alternative anti-skid control, as shown in FIG. 7, the braking pressure Pwf of the front wheels which are one of the front and rear wheel group is permitted to become higher than the lock pressure Plor of the rear wheels which are the other wheel group, but the upstream pressure Pu is controlled so as not to be higher than the look pressure Plof of the front wheels and the braking pressure Pwr increase of the rear wheels is suppressed so that the braking pressure of the rear wheels does not become higher than the lock pressure of the rear wheels. In other words, while controlling the braking pressure of the rear wheels so as not to exceed the lock pressure Plor of the rear wheels, the upstream pressure Pu is controlled so that the braking pressure Pwf of the front wheels becomes equal to or higher than the lock pressure Plor of the rear wheels as much as possible. Therefore, the braking pressure Pwf of the front wheels can be increased to a pressure equal to or higher than the lock pressure Plor of the rear wheels as much as possible, and the braking force of the entire vehicle can be increased by increasing the braking forces of the front wheels.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above embodiment, ground contact loads of the front wheels are higher than ground contact loads of the rear wheels, and the front-rear wheel distribution ratio of braking forces are set toward the front wheels. However, in a vehicle having a large load such as a truck, ground contact loads of the rear wheels are higher than ground contact loads of the front wheels, and the front-rear distribution ratio of braking forces are set toward the rear wheels, so that the rear wheels are high pressure group wheels and the front wheels are low pressure group wheels. Therefore, in a vehicle having a large load, the alternative anti-skid control according to the flowcharts shown in FIGS. 3 to 6 may be executed with the front wheels and rear wheels in FIGS. 3 to 6 interchanged.

In the above embodiment, as described as the cases D-1-1 and D-1-3 above, when the upstream pressure Pu is decreased to a pressure lower than the lock pressure Plor of the rear wheels, the upstream pressure Pu and the braking pressure Pwf of the front wheels are increased, but the braking pressure Pwr of the rear wheels is maintained for a predetermined time and then increased, so that the pressure increase is suppressed. However, as shown by the dash-dotted line in FIG. 7, for example, an increase of the braking pressure Pwr of the rear wheels may be suppressed by increasing the pressure at a pressure increase gradient smaller than the pressure increase gradient of the upstream pressure Pu without maintaining the pressure. It should be noted that although the dash-dotted line in FIG. 7 is a straight line, it may a line consisting of a plurality of straight lines or a curve in which the pressure increase gradually changes. Likewise, the broken line showing the pressure increase of the braking pressure Pwr of the rear wheels in FIG. 7 is also a straight line, but it may be a line consisting of a plurality of straight lines or a curve which forms a convex shape and gradually changes the pressure increase gradient.

According to these modified embodiments, the braking force of the rear wheels can be increased by increasing the braking pressure Pwr of the rear wheels as compared to the embodiment while reducing the possibility of locking of the rear wheels. Therefore, it is possible to effectively satisfy the braking demand of the driver as compared to the embodiment.

In the above embodiment, in a situation where the downstream braking actuator is in the specific abnormality and a braking operation amount of a driver is excessive, the upstream pressure Pu is controlled to be the same value as the braking pressure of the high pressure wheels. However, as shown by a thin two-dot chain line in FIG. 7, the upstream pressure Pu may be controlled to be higher than the braking pressure of the high pressure wheels, and the pressure increasing-holding valves and the pressure decreasing valves of the high pressure wheels may be controlled so that the braking pressure of the high pressure wheels does not exceed the lock pressure of the high pressure wheels. According to this modification, the braking pressure of the high pressure wheels can be increased to a pressure higher than the lock pressure of the low pressure wheels and equal to or lower than the lock pressure of the high pressure wheels without limiting the upstream pressure Pu to a pressure equal to or lower than the lock pressure of the high pressure wheels.

In the above embodiment, the upstream braking actuator 12 and the downstream braking actuator 14 are controlled by the electronic control unit 16. However, the upstream braking actuator 12 and the downstream braking actuator 14 may each be controlled by a respective electronic control unit. In that case, the control according to the flow charts shown in FIGS. 2 to 6 may be shared by two electronic control units.

Further, in the above-described embodiment, the upstream pressure control valve 24 includes a pressure increasing control valve 24I and a pressure decreasing control valve 24D. However, the pressure increasing control valve 24I and the pressure decreasing control valve 24D may be replaced by a valve device of three-port three-position switching type which controls the communication and the degree of communication between the supply conduit 50R and both the supply conduit 40 and the discharge conduit 60.

Further, in the above-described embodiment, the upstream braking actuator 12 includes a master cylinder device 18, a hydraulic pressure supply source 20, master cut valves 22F and 22R, and an upstream pressure control valve 24. However, as described in, for example, Japanese Patent Application Laid-Open Publication No. 2017-52305, the upstream brake actuator 12 may be an upstream braking actuator of back pressure control type which can control the upstream pressure Pu by controlling the master cylinder 28 and the back pressure of the regulator 30.

Further, in the above-described embodiment, decreasing of the braking pressure is performed by opening the pressure decreasing valves 68FL to 68RR and returning the oil to the reservoir 33, but may be performed by opening the pressure decreasing valves and sucking the oil by the oil pump.

What is claimed is:

1. A braking force control device for a vehicle comprising:
an upstream braking actuator comprising:
a master cylinder device that is driven by braking operation of a driver and generates a common upstream pressure for a left front wheel and a right front wheel constituting a front wheel group and a left rear wheel and a right rear wheel constituting a rear wheel group,
a reservoir that stores a brake oil,
an oil pump that pumps the brake oil from the reservoir to discharge high pressure brake oil, and
an upstream pressure control valve configured to control the common upstream pressure using the high pressure brake oil;
a downstream braking actuator that individually controls braking pressures that are pressures in braking force generating devices of the left and right front wheels and the left and right rear wheels using the upstream pressure; and
a control unit for controlling the upstream braking actuator and the downstream braking actuator, the control unit being configured to:
when an anti-skid control starting condition is satisfied for any one of the wheels, control the downstream braking actuator in at least one of a pressure increasing mode, a pressure holding mode, and a pressure decreasing mode so that a degree of braking slip of a relevant wheel falls within a predetermined range until an anti-skid control ending condition is satisfied, the relevant wheel being the wheel for which the anti-skid control starting condition is satisfied,
control the downstream braking actuator in a non-control mode so that braking pressures of the wheels other than the relevant wheel become values corresponding to a braking operation amount of the driver,
control the upstream pressure control valve in at least one of a pressure increasing mode, a pressure holding mode, a pressure decreasing mode, and a non-controlling mode, and set the upstream pressure to the pressure in the master cylinder device in the non-control mode, and
when a specific abnormality in which the upstream pressure can be supplied from the upstream braking actuator to the braking force generating device of each wheel but a braking pressure in the braking force generating device of any one of the wheels cannot be decreased due to failure in a pressure decreasing valve of each wheel causing an inability to discharge the brake oil into the reservoir occurs in the downstream braking actuator, execute an alternative anti-skid control in which the braking pressure of one wheel group is controlled by controlling at least the upstream braking actuator when the upstream pressure is supplied to the braking force generating device of each wheel such that the braking pressure of the one wheel group is permitted to be higher than a lock pressure of the other wheel group but does not become higher than the lock pressure of the one wheel group, and the braking pressure of the other wheel group is controlled so that the braking pressure of the other wheel group does not become higher than the lock pressure of the other wheel group, wherein the lock pressure is the braking pressure when a braking pressure control mode changes to the pressure decreasing mode for a first time after the anti-skid control starting condition is satisfied for the one wheel group, and during an anti-skid control, the downstream braking actuator is configured such that, the lock pressure of one of the front wheel group and the rear wheel group is higher than the lock pressure of the other of the front wheel group and the rear wheel group.

2. The braking force control device for a vehicle according to claim 1, wherein the control unit is further configured to determine that the wheel group that includes the wheel that was changed by the anti-skid control from the non-control mode to the pressure decreasing mode for the first time after satisfying the anti-skid control starting condition is the other wheel group.

3. The braking force control device for a vehicle according to claim 1, wherein when the anti-skid control starting condition is satisfied for the other wheel group and the braking pressure control mode is changed to the pressure decreasing mode while the alternative anti-skid control is performed and the braking pressure of the one wheel group and the braking pressure of the other wheel group is equal to or lower than the lock pressure of the other wheel group, the control unit is further configured to:

decrease the upstream pressure to a pressure lower than the lock pressure of the other wheel group;

increase, by increasing the upstream pressure, the braking pressure of the one wheel group to a pressure higher than the lock pressure of the other wheel group and equal to or lower than the lock pressure of the one wheel group; and suppress the increase of the braking pressure of the other wheel group so that the braking pressure of the other wheel group does not become higher than the lock pressure of the other wheel group.

4. The braking force control device for a vehicle according to claim 1, wherein when the starting condition of the anti-skid control is satisfied for the one wheel group and the braking pressure control mode by the anti-skid control is changed from to the pressure decreasing mode in a situation where the alternative anti-skid control is performed, the control unit is further configured to:

decrease the upstream pressure to a pressure higher than the lock pressure of the other wheel group and equal to or lower than the lock pressure of the one wheel group, and control the upstream pressure using the same control mode as the anti-skid control on the one wheel group.

5. The braking force control device for a vehicle according to claim 3, wherein the control unit is further configured to suppress the increase of the braking pressure of the other wheel group by decreasing the upstream pressure to a pressure lower than the lock pressure of the other wheel group and, thereafter, holding the braking pressure of the other wheel group for a prescribed period of time.

6. The braking force control device for a vehicle according to claim 3, wherein the control unit is further configured to suppress the increase of the braking pressure of the other wheel group by decreasing the upstream pressure to a pressure lower than the lock pressure of the other wheel group and, thereafter, increasing the braking pressure of the other wheel group at a pressure increase gradient lower than the pressure increase gradient of the upstream pressure.

7. The braking force control device for a vehicle according to claim 3, wherein the downstream braking actuator comprises a pressure increasing-decreasing control valve provided corresponding to each wheel, and wherein the control unit is further configured to increase the braking pressure of the one wheel group to a pressure higher than the lock pressure of the other wheel group and equal to or lower than the lock pressure of the one wheel group by controlling the upstream pressure to a pressure higher than the lock pressure of the other wheel group and equal to or lower than the lock pressure of the one wheel group, and to suppress the increase of the braking pressure of the other wheel group by controlling the pressure increasing-decreasing control valves of the other wheel group.

8. The braking force control device for a vehicle according to claim 3, wherein the downstream braking actuator comprises a pressure increasing-decreasing control valve provided corresponding to each wheel, and wherein the control unit is configured further to increase the braking pressure of the one wheel group to a pressure higher than the lock pressure of the other wheel group and equal to or lower than the lock pressure of the one wheel group by increasing the upstream pressure to a pressure higher than the lock pressure of the other wheel group and controlling the pressure increasing-decreasing control valves of the one wheel group, and to suppress the increase of the braking pressure of the other wheel group by controlling the pressure increasing-decreasing control valves of the other wheel group.

9. The braking force control device for a vehicle according to claim 1, wherein when the starting condition of the anti-skid control is satisfied for the other wheel group and the braking pressure control mode by the anti-skid control is changed from the mode other than the pressure decreasing mode to the pressure decreasing node in a situation where the alternative anti-skid control is performed and the braking pressure of the one wheel group is higher than the braking pressure of the other wheel group and is lower than the lock pressure of the one wheel group, the control unit is further configured to:

decrease the upstream pressure to a pressure lower than the lock pressure of the other wheel group, and increase, by increasing the upstream pressure, the braking pressure of the one wheel group to a pressure higher than the lock pressure of the other wheel group and equal to or lower than the lock pressure of the one wheel group, while suppressing the increase of the braking pressure of the other wheel group.

10. The braking force control device for a vehicle according to claim 9, wherein the control unit is further configured to increase the upstream pressure to a value of the upstream pressure at a time when the decrease of the upstream pressure began.

* * * * *